US007733523B2

(12) United States Patent
Matsushiro et al.

(10) Patent No.: US 7,733,523 B2
(45) Date of Patent: Jun. 8, 2010

(54) IMAGE PROCESSING METHOD, IMAGE PROCESSING APPARATUS, AND IMAGE FORMING APPARATUS

(75) Inventors: Nobuhito Matsushiro, Tokyo (JP); Norihide Miyamura, Tokyo (JP); Tomonori Kondo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1148 days.

(21) Appl. No.: 11/356,194

(22) Filed: Feb. 17, 2006

(65) Prior Publication Data

US 2006/0182455 A1 Aug. 17, 2006

(30) Foreign Application Priority Data

Feb. 17, 2005 (JP) ............................. 2005-040522

(51) Int. Cl.
*G06F 15/00* (2006.01)
*G06K 1/00* (2006.01)
*G03G 15/00* (2006.01)

(52) U.S. Cl. ....................... 358/1.9; 358/3.26; 358/504; 399/49

(58) Field of Classification Search .................. 358/1.1, 358/1.9, 2.1, 3.26, 500, 501, 504, 518, 521, 358/406, 463, 296; 399/38, 49
See application file for complete search history.

(56) References Cited

U.S. PATENT DOCUMENTS 5,260,806 A * 11/1993 Samworth .................. 358/3.01
5,491,568 A * 2/1996 Wan ........................... 358/518
6,381,037 B1 * 4/2002 Balasubramanian et al. ......................... 358/3.23

FOREIGN PATENT DOCUMENTS

JP 2001-186350 7/2001

* cited by examiner

*Primary Examiner*—Thomas D Lee
(74) *Attorney, Agent, or Firm*—Rabin & Berdo, P.C.

(57) ABSTRACT

An image processing apparatus for measuring concentration of concentration patterns by optical sensors and correcting image information on the basis of a correction value obtained on the basis of measured concentration values has: a measured concentration value obtaining unit which measures the concentration in different concentration patterns by the optical sensors and obtains the measured concentration values; an estimation value obtaining unit which estimates original concentration by an independent component analysis on the basis of the obtained measured concentration values and obtains an estimation value; and a correction value obtaining unit which obtains the correction value for allowing the measured concentration value to approach the obtained estimation value. An influence of color noises is reduced, thereby correcting an image.

11 Claims, 18 Drawing Sheets

IMAGE PROCESSING METHOD, IMAGE PROCESSING APPARATUS, AND IMAGE FORMING APPARATUS

BACKGROUND OF THE INVENTION

1. Field of the Invention

The invention relates to an image processing method of an image processing apparatus for correcting an image, the image processing apparatus, and an image forming apparatus having an image correcting function.

2. Related Background Art

An image forming apparatus such as printer, copying apparatus, or the like forms an image onto a medium on the basis of image information which is obtained. As an image which is formed, particularly, it is demanded that its concentration and color are reproduced with fidelity on the basis of the image information. However, there is such a problem that reproducibility deteriorates due to an aging change or the like in the image forming function of the image processing apparatus. To solve such a problem, the image information is corrected.

For example, a technique in which concentration of a predetermined concentration pattern is measured by an optical sensor and a concentration change is corrected on the basis of a concentration value obtained by the measurement has been disclosed in JP-A-2001-186350.

In the case where the optical sensor for the concentration correction is, for example, a reflecting type, if noises are included in the measurement result due to a deterioration in light source necessary for reflection, a change in measuring characteristics of the optical sensor, a change in distance to the concentration pattern, or the like or noises generated by some cause are included in the measurement result, noises called color noises having a deviation in a noise energy in frequency components are included when they are expressed by a graph in which the frequency components of the noises are shown on an axis of abscissa and energy components of the noises are shown on an axis of ordinate.

In the color noises, the deviation exists in the noise energy in the frequency components as compared with noises called white noises having characteristics in which a noise energy in the frequency components is flat. Therefore, an influence of the white noises in which the noise energy in the frequency components is flat can be relatively easily reduced because of the uniform characteristics. In the color noises, however, since the deviation exists in the noise energy in the frequency components, it is fairly difficult to reduce its influence and it is demanded to develop a correcting method in which the influence of the color noises is reduced.

SUMMARY OF THE INVENTION

In consideration of the above problem, it is an object of the invention to provide an image processing method of correcting an image while reducing an influence of color noises, and an image processing apparatus and an image forming apparatus to which the image processing method is applied.

According to the present invention, there is provided an image processing method of measuring concentration of a plurality of concentration patterns by optical sensors and correcting image information on the basis of a correction value which is obtained on the basis of values of the measured concentration, comprising the steps of:

measuring the concentration in a plurality of different concentration patterns by a plurality of optical sensors and obtaining the measured concentration values;

estimating original concentration by an independent component analysis on the basis of the obtained measured concentration values and obtaining an estimation value; and obtaining the correction value on the basis of the obtained estimation value and a predetermined reference concentration value.

According to the invention, the concentration values in a plurality of different concentration patterns are measured by a plurality of optical sensors, the independent component analysis is made on the basis of each of the measured concentration values, and the estimation value of the original concentration which is not influenced by the color noises is obtained. By obtaining the correction value of the concentration on the basis of the obtained estimation value of the original concentration and the predetermined reference concentration value, the color noises included in the measured concentration values can be separated by the correction value. Thus, the color noises included in the measured concentration values are separated by using the correction value and the color noises included in the measured concentration values can be reduced.

Further, according to the invention, when the independent component analysis is made and the estimation value of the original concentration which is not influenced by the color noises is obtained, the estimation value and the measured concentration values are transformed into the frequency area, and the frequency area estimation value and the frequency area measured concentration values are obtained. The frequency correcting function is formed on the basis of the obtained values and the inverse frequency transformation is executed to the frequency correcting function, thereby obtaining the correcting function. By correcting the measured concentration values by using the obtained correcting function, the calculation of the correction value to remove the color noises does not need to be executed every gradation. The removal correcting process of the color noises can be promptly executed.

Further, according to the invention, the image information is obtained by a plurality of image information obtaining unit, the independent component analysis is made on the basis of each of the image information, the original image which is not influenced by the color noises is estimated, the estimation original image information is obtained, and the estimation original image information and the image information are transformed into the frequency area. The frequency area estimation original image information and the frequency area image information are obtained. The frequency area correcting function is formed on the basis of those information and the correcting function is obtained by executing the inverse frequency correction transforming process to the frequency correcting function. Thus, the color noises included in the image information can be separated by using the correcting function. The color noises included in the image information can be reduced.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Figure 1:
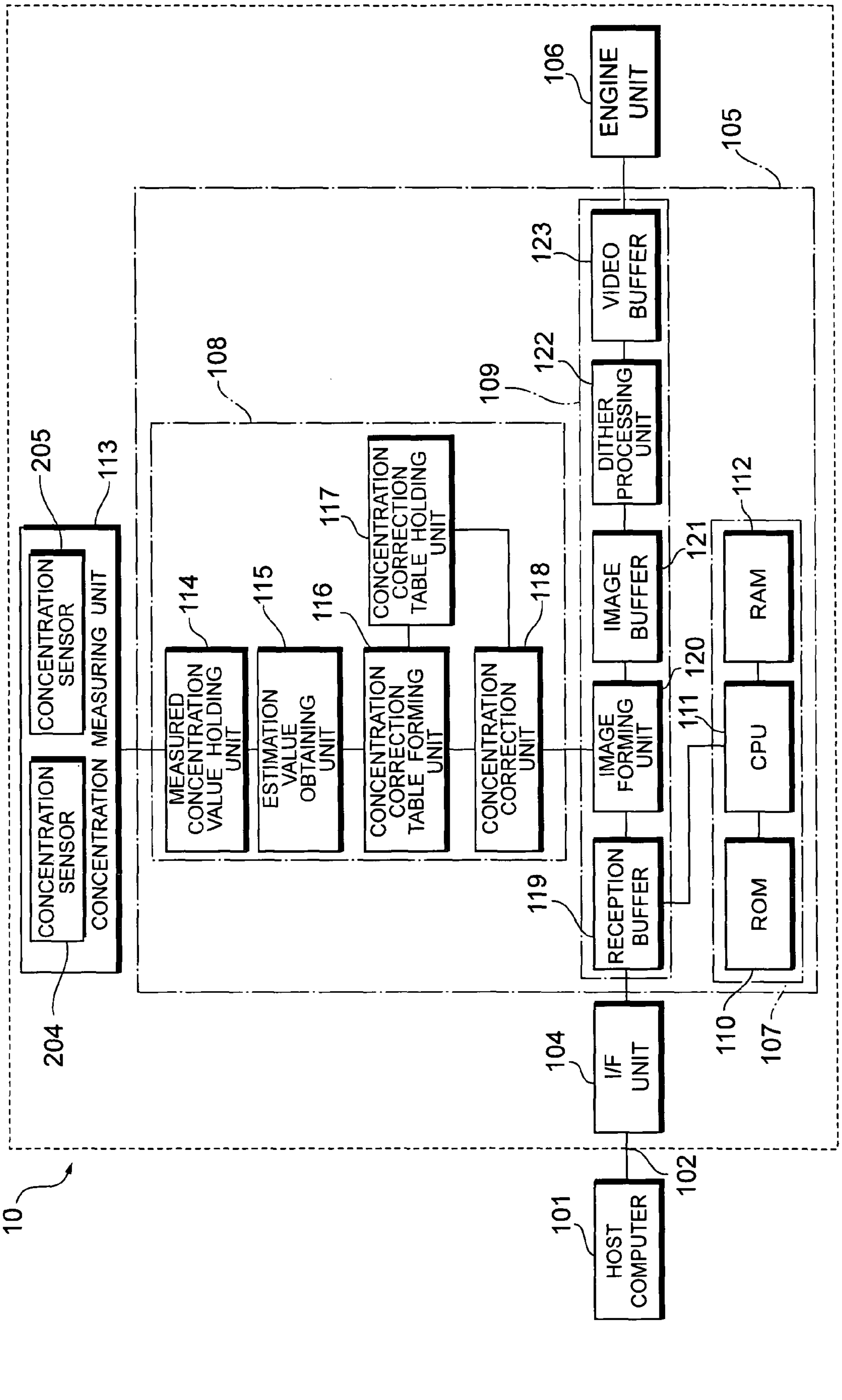
FIG. 1 is a functional block diagram of an image forming apparatus of the embodiment 1.

Embodiments of the invention will be described in detail hereinbelow with reference to the drawings. In the following description, the same component elements in the drawings which are used in each embodiment are designated by the same reference numerals and their overlapped explanation is omitted as much as possible.

Embodiment 1

An image forming apparatus of the invention is a printer, a copying apparatus, or the like and the printer will be explained as an example in the embodiment.

First, as shown in FIG. 1, a printer 10 of the invention comprises: an I/F (interface) unit 104 for connecting to a host computer 101 serving as an upper apparatus through a network 102 (communication cable) such as IEEE (the Institute of Electrical and Electronic Engineers) Standard 1284, USB (Universal Serial Bus), LAN (Local Area Network), or the like; an image processing unit 105 for executing an image process on the basis of print data (image information) which is obtained from the host computer 101; an engine unit 106 for forming an image onto a print medium on the basis of a processing result of the image processing unit 105; and a concentration measuring unit 113 for performing concentration measurement for a concentration correcting process in the image processing unit 105.

Figure 5:
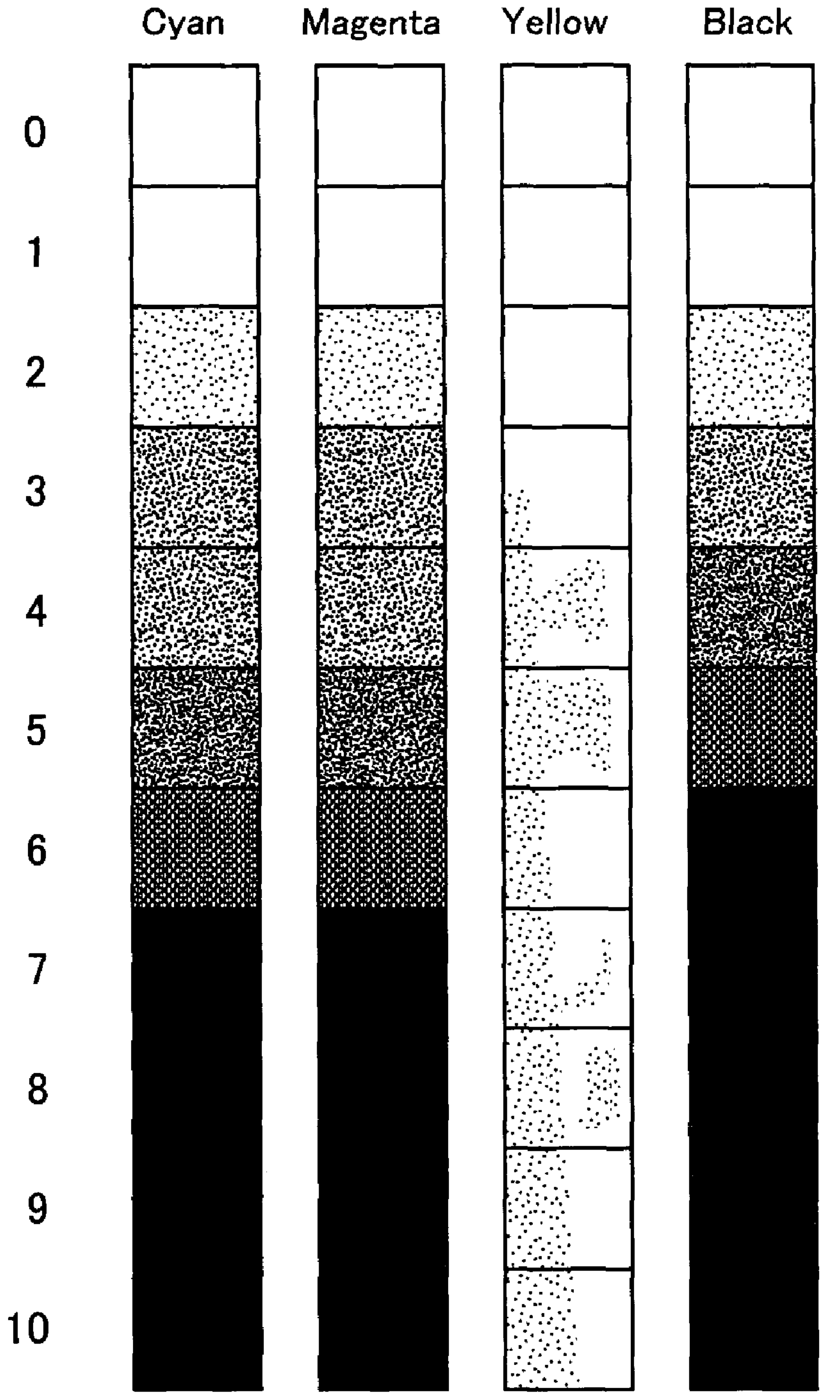
FIG. 5 is a schematic diagram of patch patterns.

The concentration measuring unit 113 are provided with a plurality of concentration sensors (optical sensors) as measured concentration value obtaining units in order to obtain measured concentration values by measuring concentration called a patch pattern constructed by print patterns printed onto a transfer body at different concentration in each color (Cyan, Magenta, Yellow, Black) shown in FIG. 5.

Figure 2:
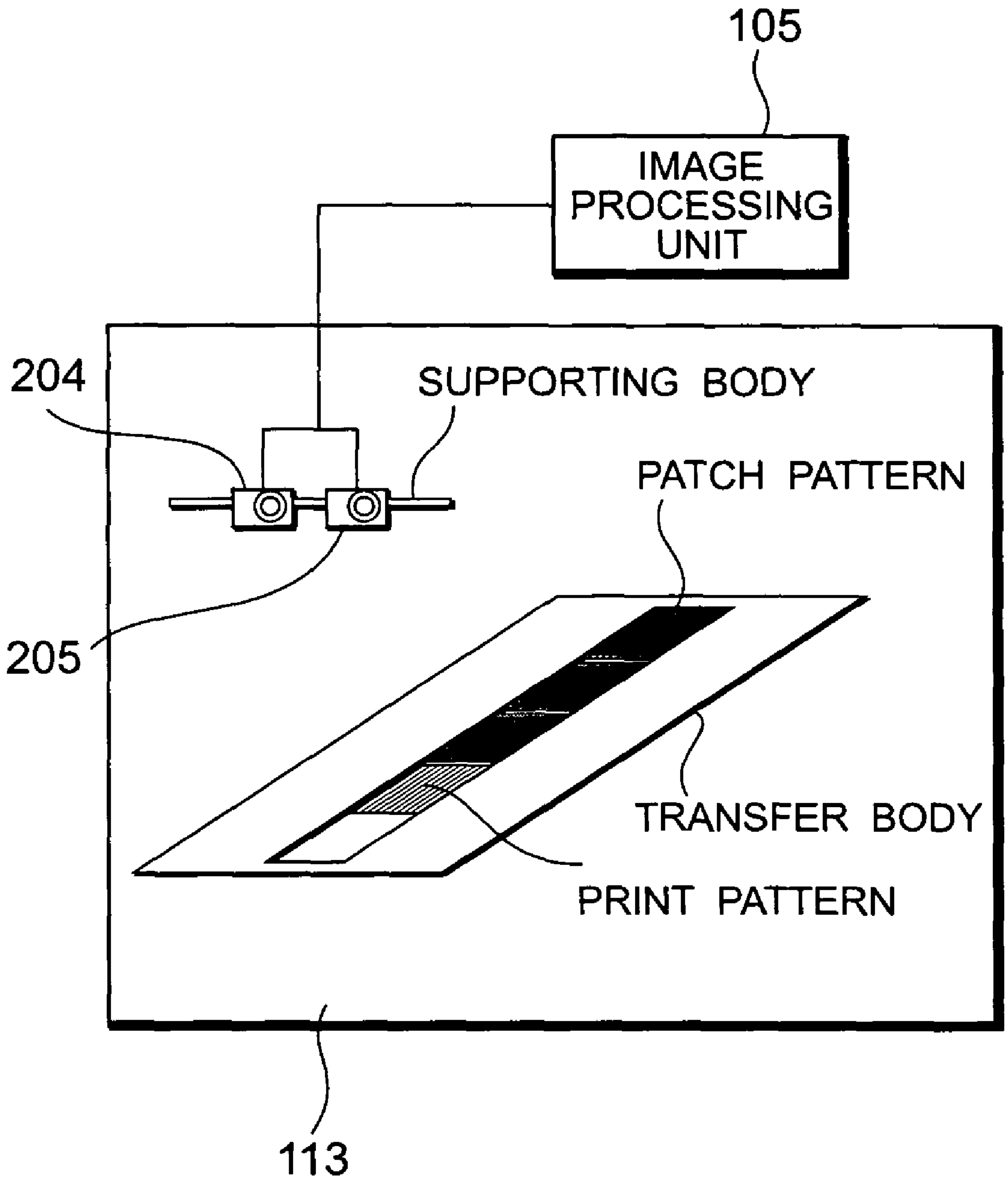
FIG. 2 is a diagram showing concentration measurement of a patch pattern.

As sown in FIG. 2, each optical sensor obtains a concentration value (measured concentration value) of each print pattern of the patch pattern (concentration pattern) printed on the transfer body, respectively. That is, the concentration measuring unit 113 obtains the concentration value in one print pattern by a plurality of optical sensors and executes the above process with respect to all of print patterns.

In a concentration correcting process, which will be explained hereinafter, measured concentration values at a number of concentration gradations in the patch pattern are necessary in order to improve correcting precision. However, the number of gradations is properly set in consideration of a time which is required for the correcting process.

Figure 4:
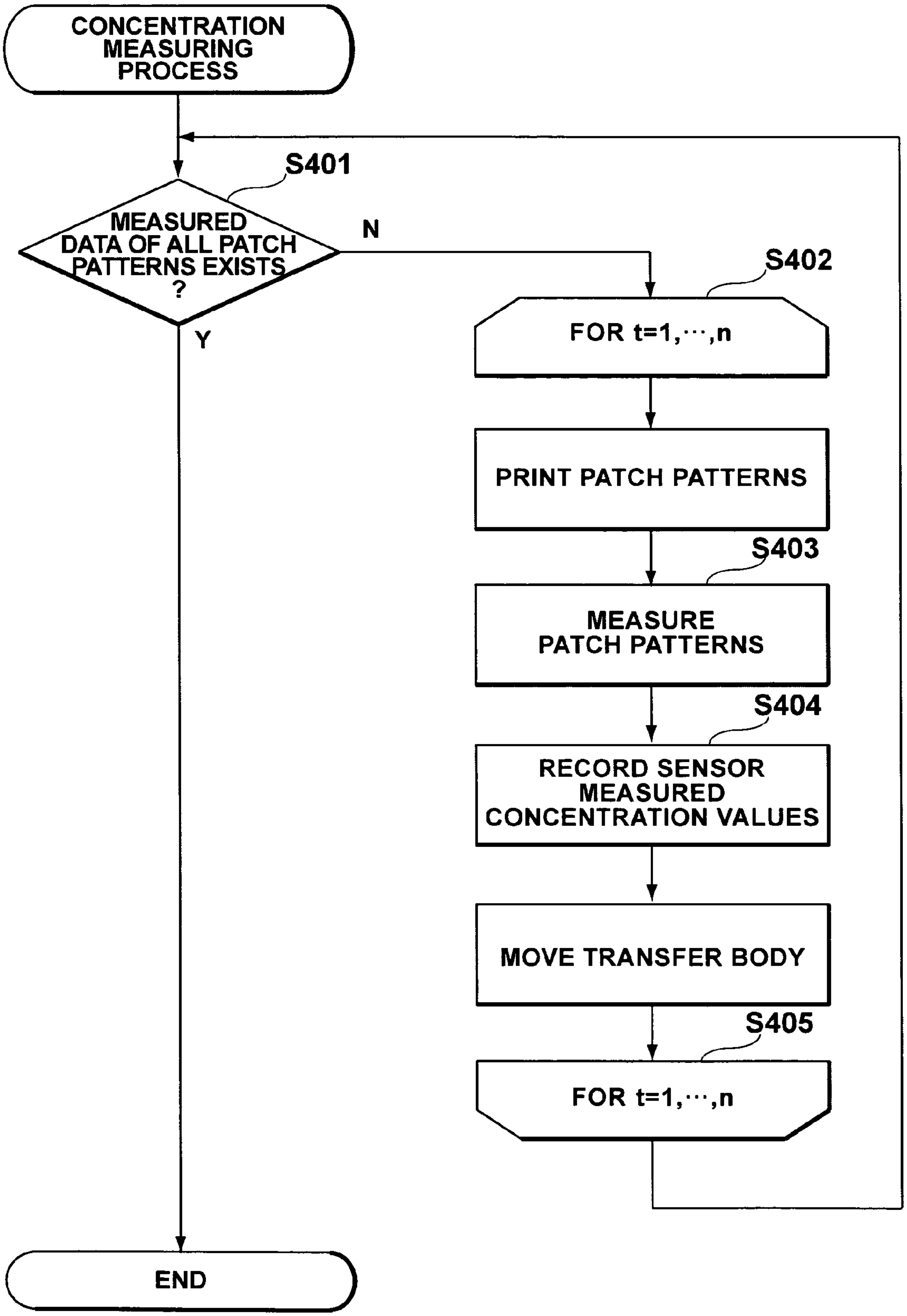
FIG. 4 is a flowchart showing the obtaining operation of measured concentration values.

The obtaining operation of the measured concentration values will now be described with reference to a flowchart of FIG. 4.

Whether or not the measured concentration values of all print patterns of the patch pattern have been held is discriminated (step S401). If the measured concentration values in all of the print patterns are not held, the concentration measuring unit 113 prints the print data of one gradation in the patch pattern regarding the concentration values onto the transfer body (step S402), measures the concentration of the printed patterns by a plurality of concentration sensors (step S403), and obtains the measured concentration values, respectively (step S404).

Each of the obtained measured concentration values is held in a measured concentration value holding unit 114, which will be explained hereinafter (step S405). The above processes are executed with respect to all of the print patterns, thereby obtaining a plurality of measured concentration values in each print pattern.

The image processing unit 105 will now be described.

The image processing unit 105 comprises: a color correcting unit 108 for forming a concentration correction table, which will be explained hereinafter, on the basis of the measured concentration values obtained in the concentration measuring unit 113 and correcting the concentration of the print data by using the concentration correction table; an image creating unit 109 for forming video data by raster-development processing the print data corrected in the color correcting unit 108 into image data of one page and outputting the video data as a processing result to the engine unit 106; and a control unit 107 for controlling each of the above units.

The control unit 107 comprises: a ROM 110 for holding programs to execute processes corresponding to flowcharts, which will be explained hereinafter, and data (set values); a CPU 111 for executing the programs; and a RAM 112 serving as a work area for the processes which are executed in the CPU 111.

The image creating unit 109 comprises: a reception buffer 119 for holding the print data which is obtained through the I/F unit 104; an image forming unit 120 for raster-processing the image data corrected in the color correcting unit 108 into image data of one page; an image buffer 121 for holding the image data formed in the image forming unit; a dither processing unit 122 for forming the video data by executing a pseudo gradation process (dither process) on the basis of the image data; and a video buffer 123 for holding the formed video data.

Figure 3:
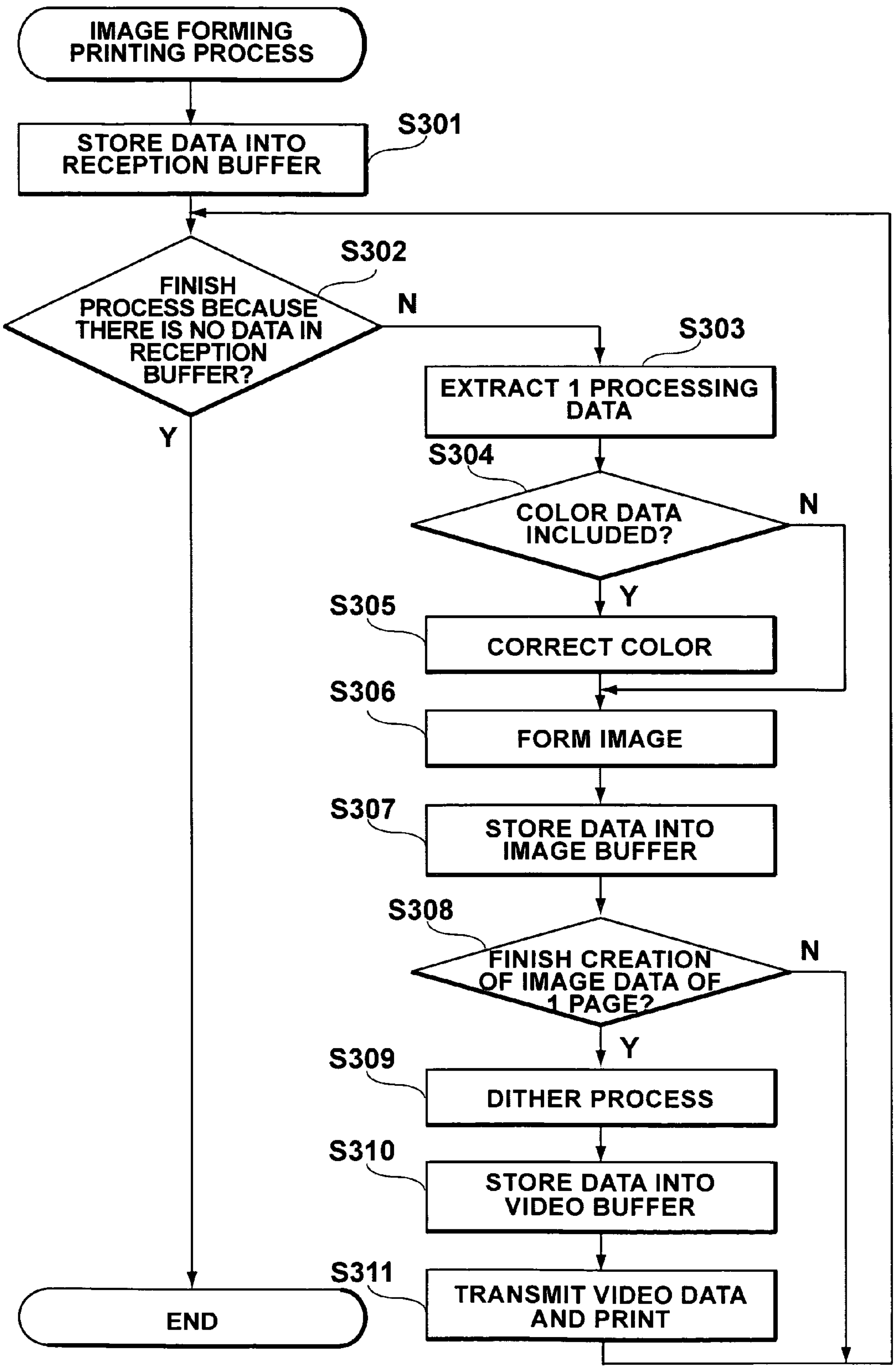
FIG. 3 is a flowchart showing an outline of the operation of the image forming apparatus of the embodiment 1.

The whole operation of the printer 10 will now be described with reference to a flowchart of FIG. 3 prior to explaining the color correcting unit 108 as a feature of the invention.

When the printer 10 receives the print data from the host computer 101, the print data is held in the reception buffer 119 (step S301). For example, in the print data held in the reception buffer 119, the print data of one page is sequentially read out and a printing process, which will be explained hereinafter, is executed. However, if there is no more print data held in the reception buffer 119, since there is no data to be print-processed (step S302), the printing process is finished.

When the data of, for example, one page is received from the reception buffer 119 (step S303), whether or not color data is included in the data and a color printing process is executed is discriminated (step S304). If the color data is included, color correction (concentration correction) is executed in the color correcting unit 108 (step S305).

The corrected data of one page is rasterized in the image forming unit 120 (step S306) and the rasterized image data is held in the image buffer 121 (step S307). When the developing process of the data of one page is finished (step S308), a dither process is executed in the dither processing unit 122 (step S309). The dither-processed data is held in the video buffer 123 (step S310).

The data held in the video buffer 123 is sent to the engine unit 106 and the engine unit 106 forms an image onto the medium on the basis of the transmitted data (step S311).

In the printer 10 having the foregoing concentration correcting function, particularly, the color correcting unit 108 for the concentration correction will now be described in detail.

As shown in FIG. 1, the color correcting unit 108 comprises: the measured concentration value holding unit 114 for holding each of the measured concentration values obtained in the concentration measuring unit 113; an estimation value obtaining unit 115 for estimating the original concentration by an independent component analysis on the basis of the measured concentration values held in the measured concentration value holding unit 114, thereby obtaining an estimation value of the original concentration (deriving the corrected sensor measured concentration value); a concentration correction table forming unit (correction value obtaining unit) 116 for obtaining the correction values on the basis of the obtained estimation value and the measured concentration value and forming a table of those correction values; a concentration correction table holding unit 117 for holding the formed correction table; and a concentration correcting unit 118 for correcting the concentration of the print data on the basis of the concentration correction table.

The concentration correction table is formed at arbitrary timing. For example, it is formed when a power source is turned on, after completion of the predetermined number of printing times, when the user designates the creation of such a table, or the like.

Figure 6:
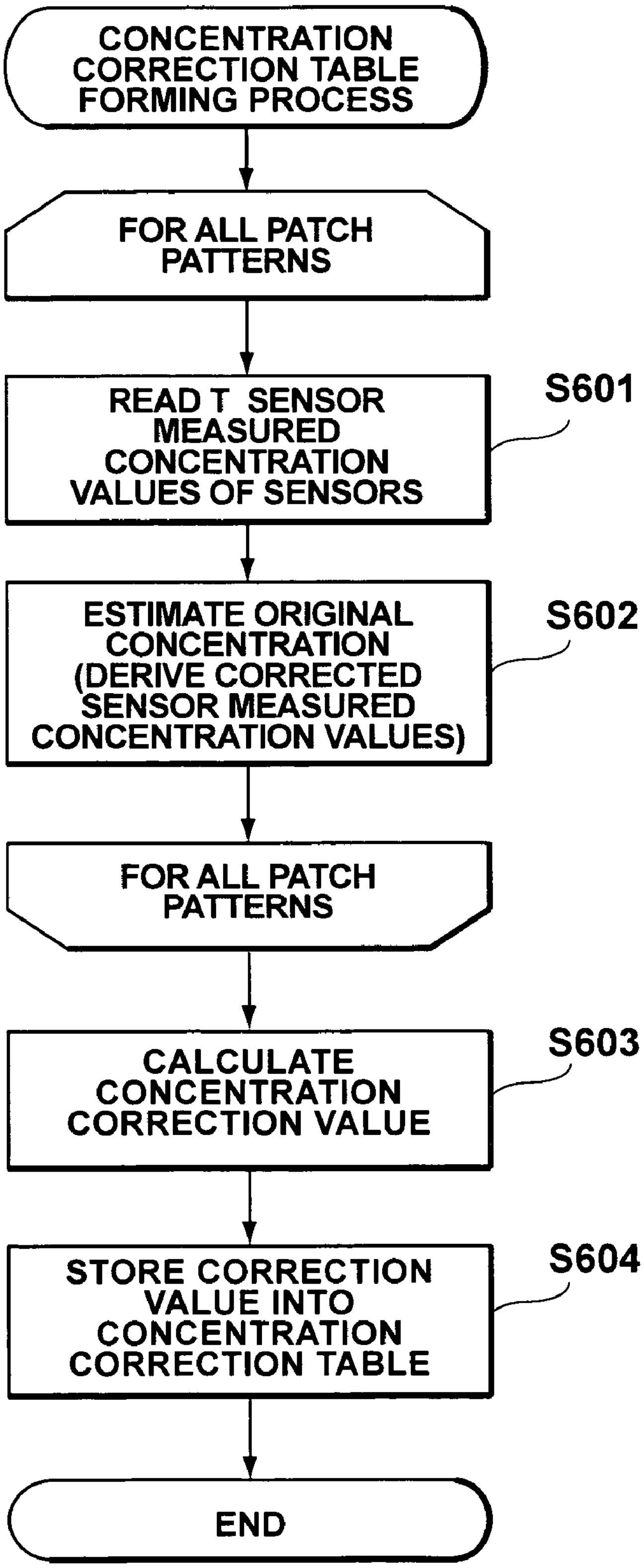
FIG. 6 is a flowchart showing the forming operation of a concentration correction table.

The creation of the concentration correction table will now be described with reference to a flowchart of FIG. 6.

When the estimation value obtaining unit 115 obtains each of the measured concentration values from the measured concentration value holding unit 114 which holds the measured concentration values in each print pattern (step S601), the original concentration is estimated by the independent component analysis, which will be explained hereinafter, on the basis of the measured concentration values, thereby obtaining the estimation value (step S602). After that, the concentration correction table forming unit 116 obtains the correction values (correction gradation values) on the basis of the obtained estimation value and the measured concentration values (step S603). The concentration correction table obtained from the obtained correction values is held in the concentration correction table holding unit 117 (step S604).

The concentration correcting unit 118 corrects the concentration of the print data by using the concentration correction table formed as mentioned above. That is, when a gradation value to reproduce the concentration of a certain color is obtained on the basis of the print data, the concentration correcting unit 118 obtains the correction gradation value for the concentration correction corresponding to such a gradation value with reference to the concentration correction table and changes the contents in the print data in order to execute the printing process on the basis of the obtained correction gradation value.

Separation of color noises will now be described.

The concentration of a certain print pattern is measured by each of concentration sensors 204 and 205. Assuming that its measured concentration value is set to x(t) and an original concentration value (true concentration value including no measurement errors) measured by each of the concentration sensors 204 and 205 is set to S(t), if a deterioration relation between the measured concentration value x(t) and the original concentration value S(t) is modeled, it can be expressed by the following equation (1).

$$x(t) = \sum_{\tau=0}^{t-1} h(\tau)s(t-\tau) \tag{1}$$

where,

τ: measuring time (a parameter in a convolution integration (previous time))

h(τ): transfer function in which τ has been substituted (deteriorating function)

When the term regarding S(t) in the right side in the equation (1) is Taylor-expanded, it can be expressed as shown in the following equation (2).

$$s(t-\tau) = s(t) - \tau s^{(1)}(t) + \frac{1}{2}\tau^2 s^{(2)}(t) + \cdots \tag{2}$$

where, $S^{(1)}(t)$: first order differentiation of S(t)

$S^{(2)}(t)$: second order differentiation of S(t)

When the equation (1) is modified by using the equation (2), it can be expressed as shown in the following equation (3).

$$x(t)=a_0S(t)+a_1S^{(1)}(t)+a_2S^{(2)}(t)+ \tag{3}$$

where, $$a_0 = \sum_{\tau=-T}^{T} h(\tau)$$

$$a_1 = \sum_{\tau=-T}^{T} (-\tau)h(\tau)$$

$$a_2 = \sum_{\tau=-T}^{T} \frac{1}{2}\tau^2 h(\tau)$$

Therefore, it can be considered that the portion after $a_0S(t)$ in the equation (3), that is, the portion of $a_1S^{(1)}(t)+a_2S^{(2)}(t)+\ldots$ is the noises in the sensor measured concentration values, that is, the portion obtained by modeling the color noises included in the sensor measured concentration values.

One print pattern is measured by the two concentration sensors 204 and 205, respectively. It is now assumed that measured concentration values at the time when the measured values are deteriorated by two different deteriorating functions $h_1$ and $h_2$ are set to $x_1(t)$ and $x_2(t)$. When it is assumed that the foregoing Taylor expansion is executed up to the first degree, the original concentration value is set to a vector $S(t)=[S(t), S^{(1)}(t)]^T$, and a deteriorated concentration value (measured concentration value) is set to a vector $X(t)=[x_1(t), x_2(t)]^T$ (where, T: a transposed matrix), on the basis of the equation (3), it can be considered that the vector X(t) is a linear coupling of the vector S(t). When its coupling amount is assumed to be a matrix A, it can be expressed by a linear equation of a scalar arithmetic operation as shown in the following equation (4).

$$X(t)=A\cdot S(t) \quad (4)$$

At this time, assuming that the matrix A in the equation (4) is set to a matrix of n=2, its relation can be expressed by the following equation (5).

$$\begin{bmatrix} x_1(t) \\ x_2(t) \end{bmatrix} = \begin{bmatrix} a_{11} & a_{12} \\ a_{21} & a_{22} \end{bmatrix} \cdot \begin{bmatrix} s(t) \\ s^{(1)}(t) \end{bmatrix} \quad (5)$$

In the above equation (5), by separating S(t) and $S^{(1)}(t)$ in the signal in which S(t) and $S^{(1)}(t)$ are mixed, the original concentration value S and the deteriorated concentration value (color noises) are separated.

That is, in the equation (3) in which the sensor measured concentration values are modeled, it can be considered that the portion of $a_1S^{(1)}(t)+a_2S^{(2)}(t)+\ldots$ after $a_0S(t)$ is the portion obtained by modeling the color noises included in the sensor measured concentration values. It is considered that the color noises are approximated by $a_1S^{(1)}(t)$ (the portion after the second order differentiation is omitted) and, by separating S(t) and $S^{(1)}(t)$ by processes using the independent component analysis which will be explained by using a flowchart of FIG. 7, which will be explained hereinafter, the color noises are separated from the original concentration value.

The original concentration value S in the foregoing equation (5) is derived in the estimation value obtaining unit 115 by the independent component analysis.

As an algorithm for the independent component analysis, well-known conventional various methods such as mutual information amount minimization, entropy maximization, and the like have been proposed. In the embodiment, a method of the independent component analysis will be explained with respect to the following method as an example:

J. F. Cardoso and A. Souloumiac, "Blind beam forming for non Gaussian signals", IEE Proceedings F, 140(6): 362-370, December, 1993.

This method is called "JADE" (Joint Approximate Diagonalization of Eigenmatrices).

JADE is an algorithm for minimizing an evaluating function in which non-diagonal components of the matrix approach 0 by using simultaneous diagonalization of the matrix based on a Jacobian method. It has been proposed that the quartic cross cumulants are used in JADE as an evaluating function.

The operation of the independent component analyzing process in the estimation value obtaining unit 115 will now be described with reference to the flowchart of FIG. 7.

First, the estimation value obtaining unit 115 executes a pre-process called spheroidization in such a manner that an average of the measured concentration values $x_1=[x_1(0), \ldots, x_1(T-1)]^T$ and $x_2=[x_2(0), \ldots, x_2(T-1)]^T$ is equal to 0 and a covariance matrix becomes a unit matrix (step S701).

A spheroidizing process will now be described. In this instance, explanation will be made on the assumption that an arithmetic mean of the elements of a vector in the following expression (6) which is used in the description is described as "Ehat[·]" in the sentence.

$$K[\cdot] \quad (6)$$

A process for setting the arithmetic mean Ehat[·] to 0 can be expressed by the following equation (7).

$$\text{Error } X'(t)=X(t)-X_m \quad (7)$$

where, $$X(t)=[x_1(t),x_2(t)]^T(t=0, \ldots, T-1)$$

$$X=[X(0), \ldots, X(T-1)]^T$$

Arithmetic mean $X_m$=K[X]

A covariance matrix B of the error X'(t) is obtained as shown by the following equation (8). Assuming that a diagonal matrix having eigenvalues of the matrix B which satisfies the following equation (9) as diagonal components is set to D and a matrix having eigenvector corresponding to the eigenvalues as a column vector is set to V, a process for setting the covariance matrix of the sensor measured concentration values to the unit matrix can be expressed by the following equation (10).

$$B=K[X'(t)X'(t)^T] \quad (8)$$

$$BV=VD \quad (9)$$

$$X''(t)=D^{-1/2}V^TX'(t) \quad (10)$$

where, $D^{1/2}$ denotes that arithmetic operations of $d_{11}^{1/2}, \ldots, d_{nn}^{1/2}$ are executed to diagonal components $d_{11}$ to $d_{nn}$ As mentioned above, $X''(t)=[x''_1(t), x''_2(t)]^T$ (t=0, ..., T−1) in which the measured concentration values $X(t)=[x_1(t), x_2(t)]^T$(t=0, . . . . T−1) have been spheroidized can be obtained.

Although it is not directly concerned with the foregoing spheroidizing process, the sensor measured concentration X"(t) in which the average is equal to 0 and the covariance has been spheroidized to the unit matrix can be expressed by a relation shown by the following equation (11) on the basis of a certain orthogonal transformation $U=(u_1, \ldots, u_n)$.

$$X''(t)=U\cdot S'(t)(t=0, \ldots, T-1) \quad (11)$$

where, $$S'(t)=[S'(t),S'^{(1)}(t)]^T(t=0, \ldots, T-1)$$

denotes the original concentration value of the average "0".

Subsequently, the estimation value obtaining unit 115 obtains the quartic cross cumulants for X"(t) (t=0, ..., T−1) in which the measured concentration values have been spheroidized (step S702).

The quartic cross cumulants are shown in the following equation (12).

$$\mathrm{cum}(x_i'', x_j'', x_k'', x_1'') = E[x_i'' x_j'' x_k'' x_1''] - E[x_i'' x_j''] E[x_k'' x_1''] - E[x_i'' x_k''] E[x_j'' x_i''] - E[x_i'' x_1''] E[x_j'' x_k''] \quad i,j,k,l = 1, \ldots, n (n=2) \tag{12}$$

where, E[·] is an arithmetic symbol showing an expectation value. When a calculation is actually executed, the arithmetic mean K[·] is substituted.

In the equation (12), $$x_i'' = [x_i''(0), \ldots, x_i''(T-1)]$$

$$x_j'' = [x_j''(0), \ldots, x_j''(T-1)]$$

$$x_k'' = [x_k''(0), \ldots, x_k''(T-1)]$$

$$x_1 = [x_1''(0), \ldots, x_1''(T-1)]$$

(where, T in the above equations denotes the number of measuring times and T shown at the right shoulder in the matrix shows a transposed matrix of this matrix).

Although it is not directly concerned with the processing flow, when considering that the original concentration value $S' = [S'(0), \ldots, S'(T-1)]$ and its differentiation $S'^{(1)} = [S'^{(1)}(0), \ldots, S'^{(1)}(T-1)]$ are independent, the quartic cross cumulants can be expressed by the following equation (13).

$$cum(S_i', S_j', S_k', S_l') = \begin{cases} \kappa_i & i = j = k = l \\ O & \text{otherwise} \end{cases} \tag{13}$$

where, $$S_i' = \begin{cases} s' & i = 1 \\ s'^{(1)} & i = 2 \end{cases}, \quad S_j' = \begin{cases} s' & j = 1 \\ s'^{(1)} & j = 2' \end{cases}$$

$$S_k' = \begin{cases} s' & k = 1 \\ s'^{(1)} & k = 2 \end{cases}, \quad S_l' = \begin{cases} s' & l = 1 \\ s'^{(1)} & l = 2' \end{cases}$$

Subsequently, the estimation value obtaining unit 115 sets a set $\{M_r\}$ of matrices in an arbitrary number r (=1, . . . , R) (step S703). If a unit vector $e_k$ in which, for example, only a k component is equal to 1 is used as a set $\{M_r\}$, $e_k$ and $M_r$ can be expressed by the following equations (14) and (15).

$$e_k = [0, 0, \ldots, 1, \ldots, 0] (\text{where, } 1 \leqq k \leqq n) \tag{14}$$

$$M_r = e_k e_l^T (k,l = 1, \ldots, n) \tag{15}$$

Subsequently, a matrix $C(M_r)$ of the quartic cross cumulants contracted by the matrix $M_r = (m_{ij})_r$ and shown in the following equation (16) is obtained (step S704).

$$C(M_r) = \left( \sum_{k,l=1}^{n} cum(X_i'', X_j'', X_k'', X_l'')(m_{kl})_r \right) \tag{16}$$

Although it is not directly concerned with the process, the matrix of the quartic cross cumulants can be expressed as shown in the following equation (17) on the basis of the equations (11) and (13).

$$C(M_r) = U \Lambda(M_r) U^T$$

$$\Lambda(M_r) = \mathrm{diag}(k_1 u_1^T M_r u_1, \ldots, k_n u_n^T M_r u_n) \tag{17}$$

Subsequently, an orthogonal matrix which simultaneously diagonalizes the obtained matrix $C(M_r)$(r=1, . . . , R) is obtained (step S705). The obtained orthogonal matrix corresponds to an estimation value Uhat (ε) of the matrix U in the equation (11) mentioned above.

That is, this is because, as shown in the equation (17), $\{C(M_r)\}$ can be expressed by an expression in which a diagonal matrix $\Lambda(M_r)$ is sandwiched between U and U having a nature of the orthogonal matrix.

After that, an estimation value √'(t)(t=0, . . . , T−1) of the original concentration value S'(t) (t=0, . . . , T−1) whose average is equal to "0" is obtained (step S706).

That is, the estimation value √'(t) can be obtained by the following equation (18) based on the equation (11).

$$\surd'(t) = \epsilon^T \cdot X''(t) (t = 0, \ldots, T-1) \tag{18}$$

After that, as shown in the following equation (19), the estimation value obtaining unit 115 executes an inverse spheroidizing process of the estimation value √'(t) in the original concentration value S'(t) in which the average is equal to "0" (step S707).

$$\surd(t) = \surd'(t) + U^T D^{-1/2} V^T X_m (t = 0, \ldots, T-1) \tag{19}$$

Thus, the estimation value (sensor measured concentration value after the correction) of the original concentration shown in the following equation (20) can be obtained.

$$\hat{S}(t) = [\hat{s}'(t), \hat{s}^{(1)}(t)]^T \quad (t = 0, \ldots, T-1) \tag{20}$$

As mentioned above, the standard for the separation of the original signal from the mixture signal in which two or more signals have been synthesized is considered as probabilistic independence, the original signal and the color noises (signal) can be separated from the mixture signal. For the separating process using the probabilistic independence, it is necessary to obtain a plurality of measurement results by using a plurality of concentration measuring sensors.

The algorithm for the independent component analysis using the JADE method has been described above.

As an algorithm for the independent component analysis using a method other than the JADE method, an algorithm for the independent component analysis using a correlation structure will now be described.

At two different gradations t and t', there is a correlation between $S_p(t)$ and $S_p(t')$ and a correlation in which the gradation is deviated by τ is shown in the following equation (21).

$$D_p(\tau) = E[S(t)S(t-\tau)] \tag{21}$$

At this time, a correlation matrix of the signal S(t) can be shown by the following equation (22).

$$R_S(\tau) = E[S(t)S(t-\tau)^t] \mathrm{diag}[d(\tau), d(\tau)] \tag{22}$$

A correlation matrix of an observation signal X(τ) can be shown by the following equation (23).

$$R_X(\tau) = E[X(t)X(t-\tau)^t] A R_S(\tau) A^t \tag{23}$$

If X is transformed into the following equation (24), a correlation matrix of a signal Y(t) can be shown by the following equation (25).

$$Y = WX \tag{24}$$

$$R_Y(\tau) = E[Y(t)Y(t-\tau)^t] = W R_X(\tau) W^t \tag{25}$$

If W is an inverse matrix of A, in other words, if it is a matrix which accurately separates the signal, it is a diagonal matrix for $R_Y(\tau)$ (where, τ=0, 1, 2, . . . ).

That is, an estimation amount of $R_X(\tau)$ is formed from the observation signal $X(\tau)$ by calculating an average in place of the expectation value of the equation (23). By is searching for such a matrix W that, as shown in the equation (25), when the formed estimation amount is multiplied by W from both sides, $R_X(0)$ and $R_X(\tau)$ are simultaneously diagonalized, the correct answer can be obtained.

For example, an algorithm of Cardoso in a Jacobian method is used for the diagonalization of the matrix. An estimation amount Y of the original signal S is obtained by using the equation (24) on the basis of W obtained as mentioned above and Y(t) corresponding to S(t) is set to the estimation value of the original concentration value.

By using the correlation matrix subjected to the transformation by the matrix W shown by the equation (24) in place of the correlation matrix of X as mentioned above, the correlation in the X signal can be taken into consideration. By considering the correlation, precision of the signal separation by the independent component analysis can be raised.

The independent component analysis using the correlation structure has been described above.

Figure 8:
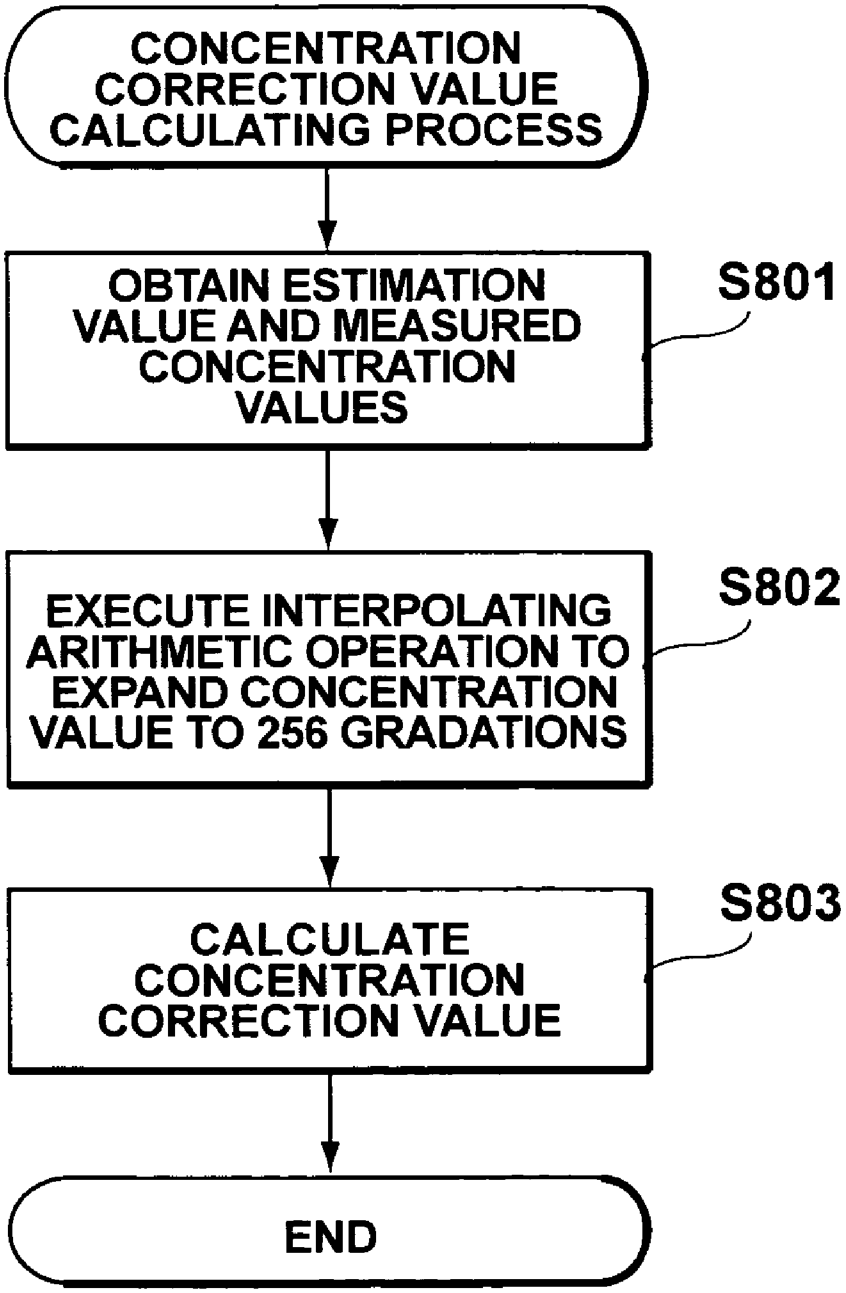
FIG. 8 is a flowchart showing the calculating operation of concentration correction values.

The calculating operation of the concentration correction value will now be described with reference to a flowchart of FIG. 8.

Figure 9:
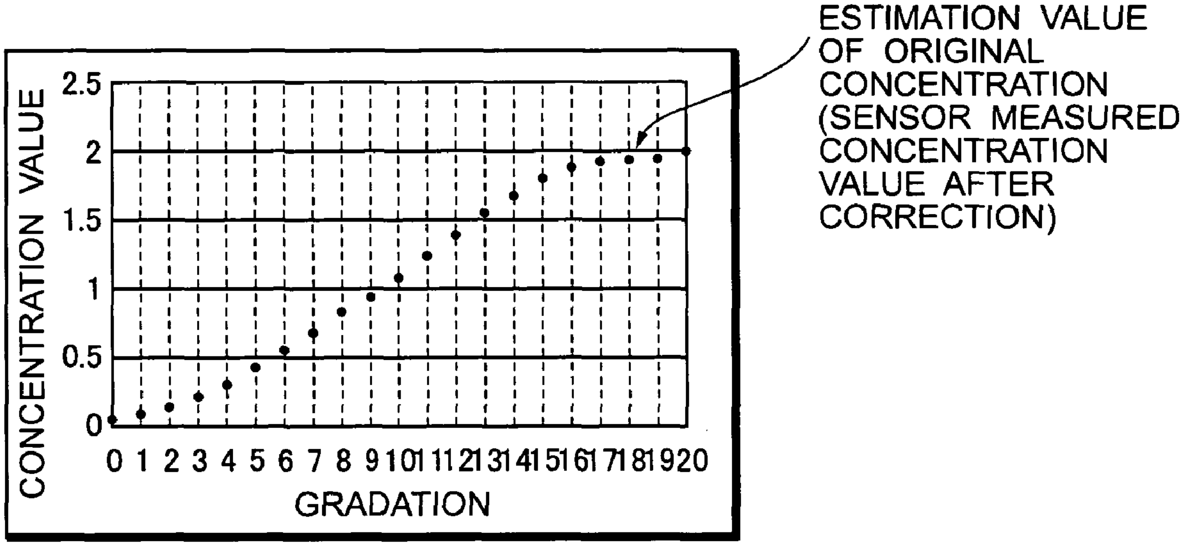
FIG. 9 is a graph showing an estimation value of an original concentration.

When the concentration correction table forming unit 116 obtains the measurement gradation from the estimation value obtaining unit 115 and the estimation value of the original concentration (sensor measured concentration value after the correction) corresponding to the measurement gradation (step S801), it executes an interpolating process for converting the concentration value into 256 gradations by an interpolation arithmetic operation such as linear interpolation, spline interpolation, or the like (step S802). By the interpolating process, the estimation value of the original concentration (sensor measured concentration value after the correction) can be expressed by a graph showing a relation between the concentration value and the gradation value as shown in FIG. 9 (however, in FIG. 9, the estimation value of the original concentration (sensor measured concentration value after the correction) is shown with respect to only 21 gradations (0 to 20) and a display of a graph after the 21st gradation is omitted).

Figure 10:
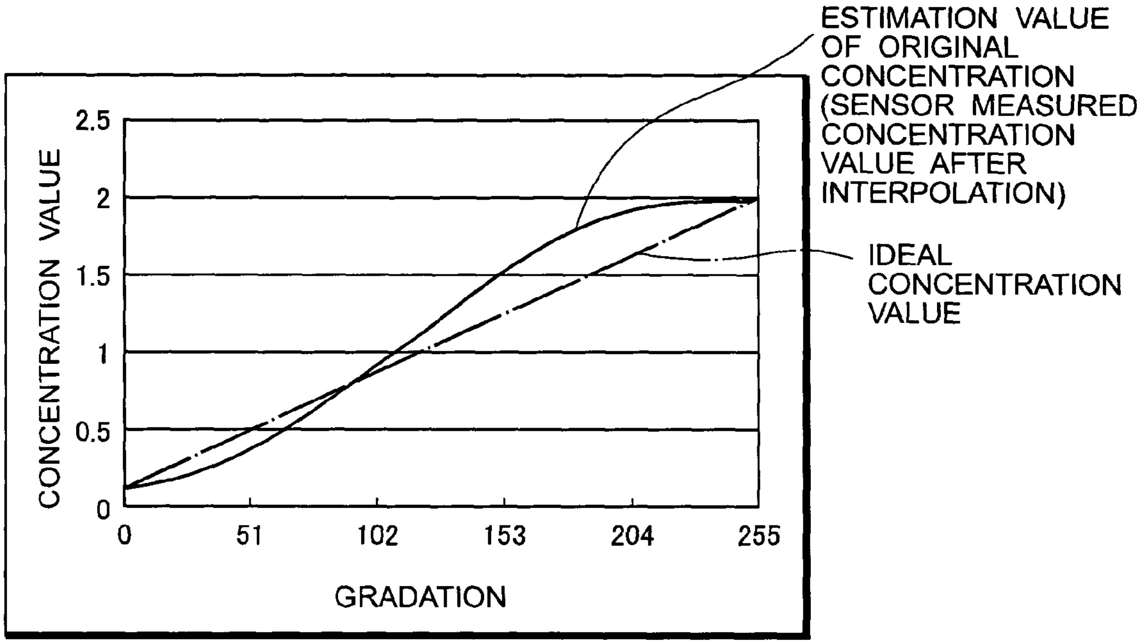
FIG. 10 is a graph showing the relation between an ideal concentration value at each gradation and the estimation value of the original concentration at each gradation.

Ideal concentration values at the respective gradations have previously been held in the concentration correction table forming unit 116. A relation between the ideal concentration value at each gradation and the estimation value of the original concentration (sensor measured concentration value after the correction) at each gradation can be shown in a graph of FIG. 10.

Figure 11:
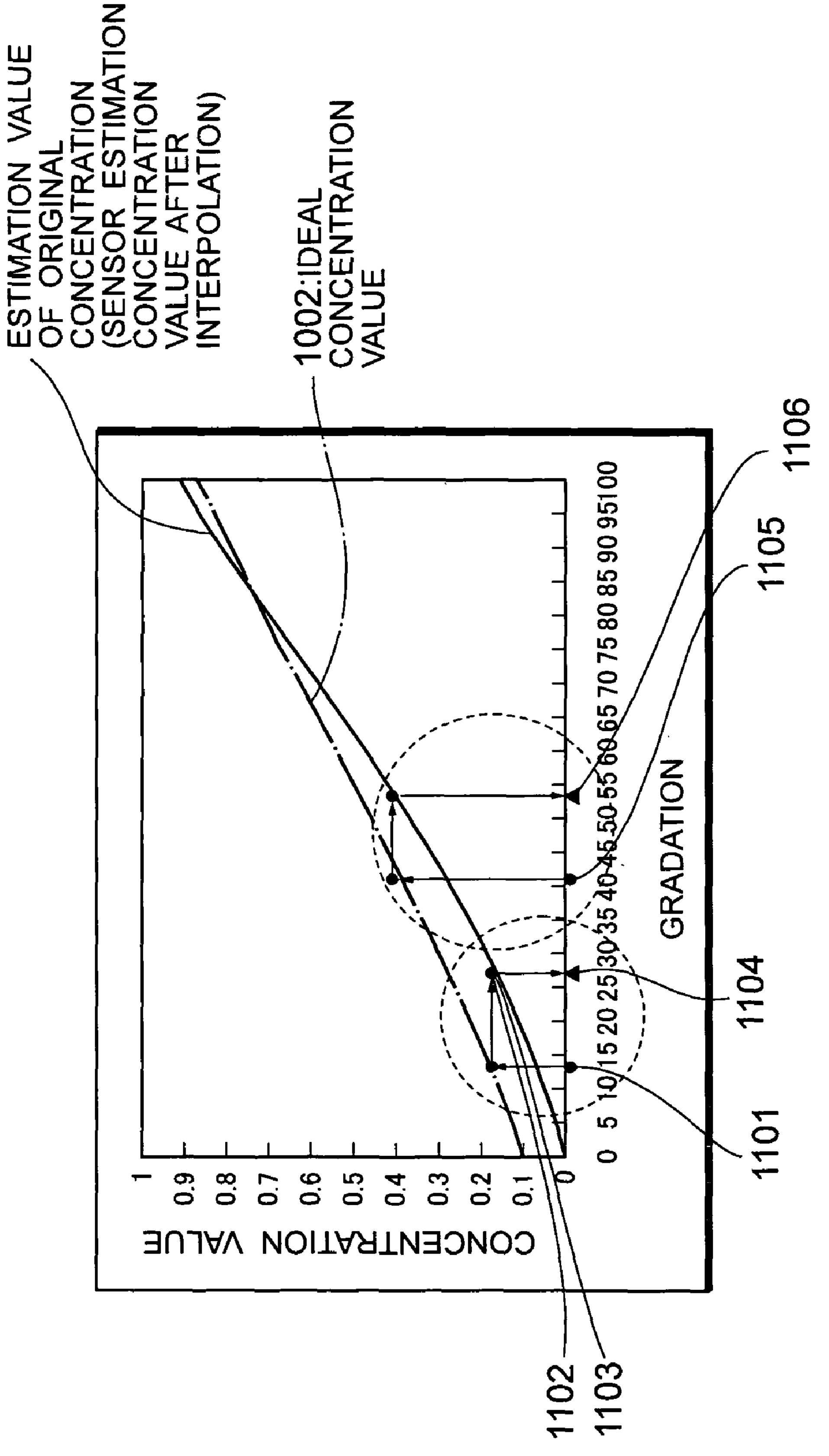
FIG. 11 is a graph showing the calculating operation of the correction value from the relation between the ideal concentration value at each gradation and the estimation value of the original concentration at each gradation.

As shown in FIG. 11, the concentration correction table forming unit 116 obtains, for example, a concentration value 1102 in a gradation value of a correction target A 1101, obtains an ideal concentration value 1002 corresponding to the concentration value 1102, and obtains a gradation value in the ideal concentration value 1002 as a gradation value after correction A 1104 (step S803). The concentration correction table forming unit 116 executes the foregoing correcting process at all of the gradations and forms a table of processing results as correction values. The obtained correction table is held in the concentration correction table holding unit 117.

On the basis of correction table held in the concentration correction table holding unit 117, the concentration correcting unit 118 performs correction regarding the concentration of the print data which is processed in the image forming unit 120.

As mentioned above, according to printer 10 of the embodiment, the concentrations in a plurality of different concentration patterns are measured by a plurality of optical sensors, respectively. The independent component analysis is made on the basis of each of the measured concentration values. The estimation value of the original concentration which is not influenced by the color noises is obtained. By obtaining the correction value of the concentration on the basis of the obtained estimation value of the original concentration and the predetermined reference concentration value, the color noises included in the measured concentration values can be separated by the correction value. Thus, the color noises included in the measured concentration values can be reduced.

In the above-stated explanation, the same patch pattern is detected by using plural concentration sensors. However, it is possible to use a same concentration sensor to plurally detect a patch pattern. In the case, it is necessary to make the patch pattern plurally pass the position the concentration can detect. That is, for example, it is possible to make a transfer body on which the patch pattern is formed pass back and forth over the position of the concentration sensor; and it also is possible to make the transfer body plurally circulate in a ringed conveyance route.

Embodiment 2

In the foregoing embodiment 1, the measured concentration values for all of the print patterns in the patch pattern have been corrected. However, the embodiment 2 is characterized in that a correcting function for the concentration correction is obtained and the correction is made by using the correcting function. As a construction for this purpose, a printer in the embodiment 2 is characterized by comprising a measured concentration correcting unit 1201 having not only the function of the estimation value obtaining unit 115 described in the embodiment 1 but also a function of obtaining the correcting function and making the concentration correction.

Figure 12:
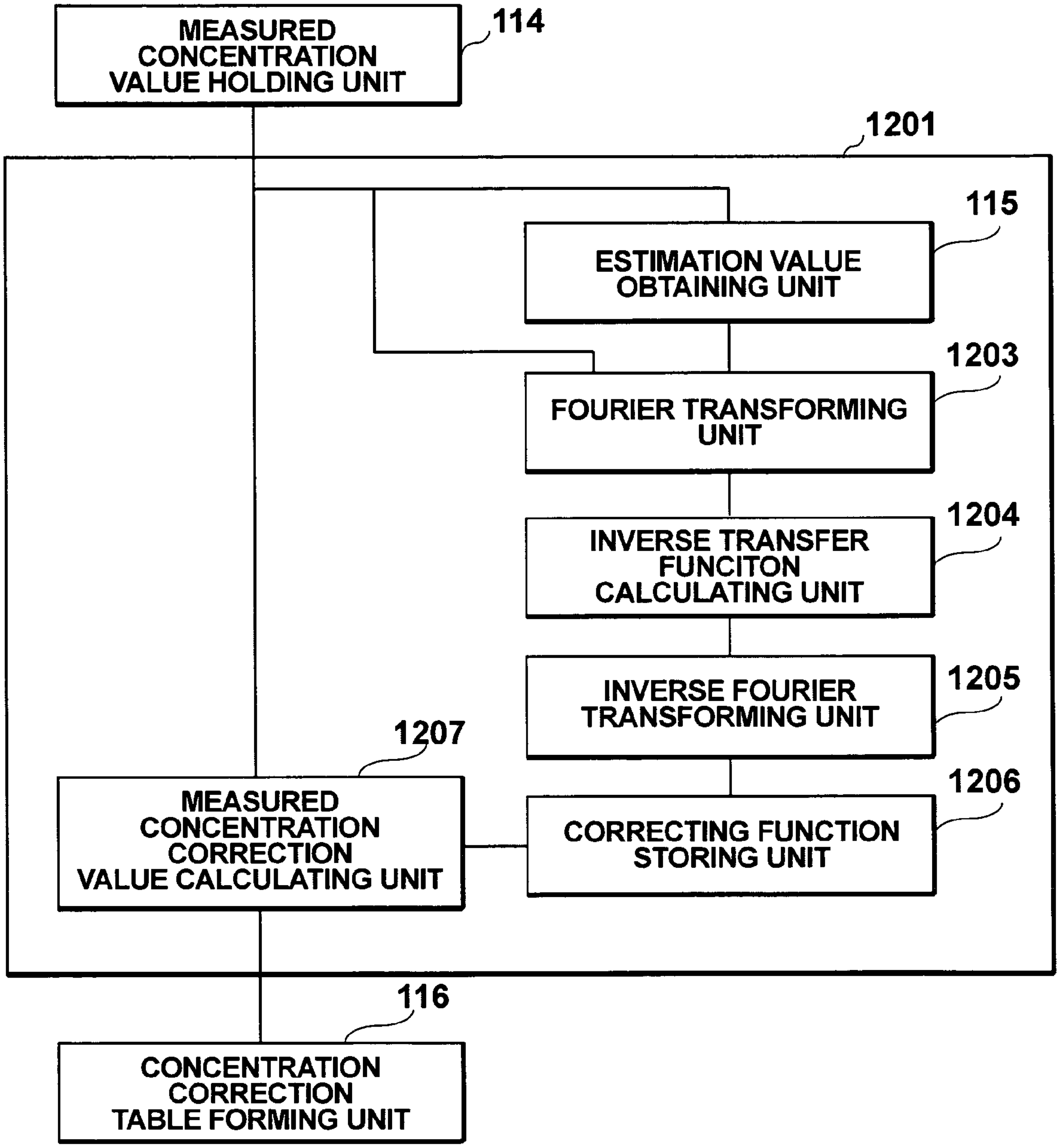
FIG. 12 is a functional block diagram of a measured concentration correcting unit of the embodiment 2.

As shown in FIG. 12, the measured concentration correcting unit 1201 comprises: the estimation value obtaining unit 115 similar to that in the embodiment 1 for obtaining the estimation value of the original concentration by the independent component analysis on the basis of a plurality of measured concentration values (by a plurality of concentration sensors) held in the measured concentration value holding unit 114; a Fourier transforming unit (frequency area transforming unit) 1203 for executing Fourier transformation to the estimation value and a plurality of measured concentration results obtained from one concentration sensor; an inverse transfer function calculating unit (frequency area correcting function forming unit) 1204 for calculating a frequency area correcting function on the basis of values obtained by executing the Fourier transforming process; an inverse Fourier transforming unit (correcting function forming unit) 1205 for obtaining a correcting function by executing inverse Fourier transformation to the obtained frequency area correcting function; a correcting function storing unit 1206 for holding the obtained correcting function; and a measured concentration correction value calculating unit 1207 for obtaining a correction value of the sensor measured concentration value by using the correcting function.

Figure 13:
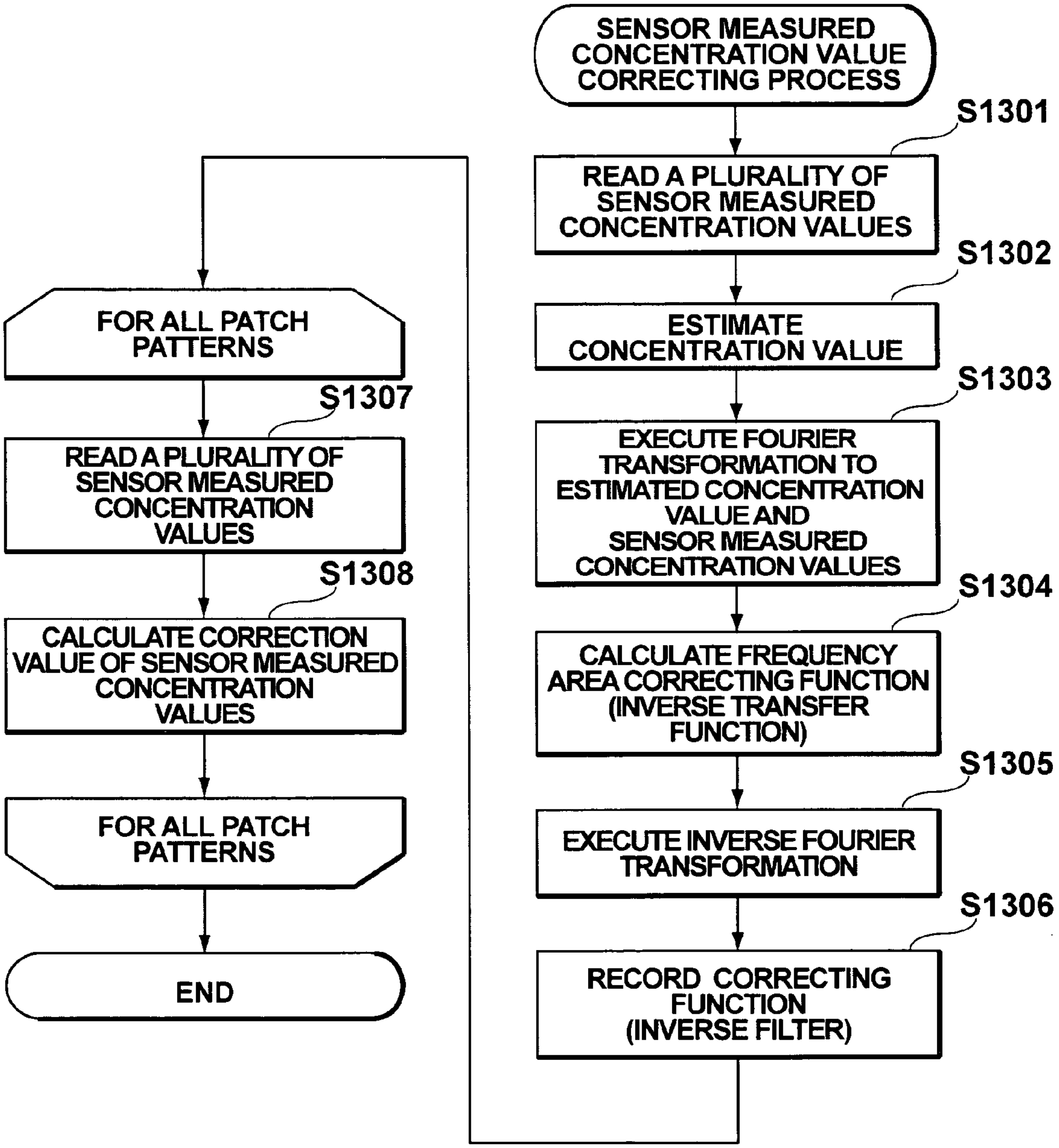
FIG. 13 is a flowchart showing the operation of the measured concentration correcting unit.

The operation of the measured concentration correcting unit 1201 will now be described with reference to a flowchart of FIG. 13.

The estimation value obtaining unit 115 obtains each of the measured concentration values from the measured concentration value holding unit 114 which holds the measured concentration values obtained by measuring a certain print pattern by the concentration sensors 204 and 205 (step S1301).

Although the measured concentration values by a plurality of concentration sensors for all print patterns are needed in the embodiment 1, in the embodiment 2, it is sufficient to provide a plurality of concentration measurement results by a plurality of concentration sensors for one print pattern. As for a plurality of concentration measurement values by a plurality of concentration sensors for other print patterns, it is sufficient that there are concentration measurement values of the number necessary for the concentration correcting process using a correlating function, which will be explained hereinafter. However, a plurality of (T) concentration measurement values are necessary for one concentration sensor in a manner similar to the embodiment 1.

Now, assuming that the concentration measurement values by a plurality of concentration sensors 204 and 205 for a certain print pattern are set to $x_1(t)$ and $x_2(t)$ in a manner similar to the embodiment 1, the estimation value obtaining unit 115 obtains the estimation value S(t) of the original concentration on the basis of $x_1(t)$ and $x_2(t)$ in a manner similar to the foregoing embodiment 1 (step S1302).

The Fourier transforming unit 1203 executes the Fourier transforming process to the obtained estimation value S(t) and each measured concentration value x(t) (step S1303).

Thus, the signal of the time area can be transformed into the signal of the frequency area.

Assuming that a result of the Fourier transforming process to the estimation value S(t) is set to Fourier[S(t)] and a result of the Fourier transforming process to the concentration measurement value x(t) is set to Fourier[x(t)], the inverse transfer function calculating unit 1204 obtains an inverse transfer function $H^{-1}(S)$ as a frequency area correcting function on the basis of the following equation (26) (step S1304).

$$H^{-1}(S)=\text{Fourier}[S(t)]/\text{Fourier}[x(t)] \quad (26)$$

After that, the inverse Fourier transforming unit 1205 executes an inverse Fourier transforming process to the obtained frequency area correcting function (inverse transfer function) and obtains an inverse filter $h^{-1}$ as a correcting function (step S1305).

The obtained correcting function is held in the correcting function storing unit 1206 (step S1306).

When the measured concentration correction value calculating unit 1207 obtains the concentration measurement values of the concentration sensor corresponding to the obtained correcting function from the measured concentration value holding unit 114 (step S1307), it obtains a measured concentration correction value on the basis of the concentration measurement values of the concentration sensor and the correcting function held in the correcting function storing unit 1206. The measured concentration correction value calculating unit 1207 calculates the measured concentration correction value on the basis of the following equation (27).

$$S(t)=h^{-1}(t)*x(t) \quad (27)$$

where, *: convolution integration

The measured concentration correction value calculating unit 1207 executes the processes of steps S1306 and S1307 mentioned above to all of the print patterns, thereby calculating the measured concentration correction value in each print pattern (step S1308).

The concentration correction table forming unit 116 forms the concentration correction table from the measured concentration correction values calculated in the measured concentration correction value calculating unit 1207. The formed concentration correction table is held in the concentration correction table holding unit 117.

As mentioned above, according to the embodiment 2, the signal in the time area is converted into the signal in the frequency area by the Fourier transforming process. The inverse transfer function is obtained by using the result of the transforming process. The signal in the frequency area is converted into the signal in the time area by the inverse Fourier transforming process by using the obtained inverse transfer function, thereby obtaining the correcting function. The measured concentration correction value of the sensor is calculated by using the correcting function. Therefore, there is no need to estimate the original concentration every print pattern. The calculation of the correction value to reduce the color noises can be promptly executed. Thus, the concentration correcting process can be promptly executed.

Embodiment 3

An image processing apparatus 1801 having a deterioration correcting function will now be described.

Although the concentration of the patch pattern has been measured by using the concentration sensors in the foregoing embodiment, in the embodiment 3, an image processing apparatus in which image data of the original image is obtained by image scanners and deterioration of the image is corrected on the basis of the obtained image data will be described.

Figure 14:
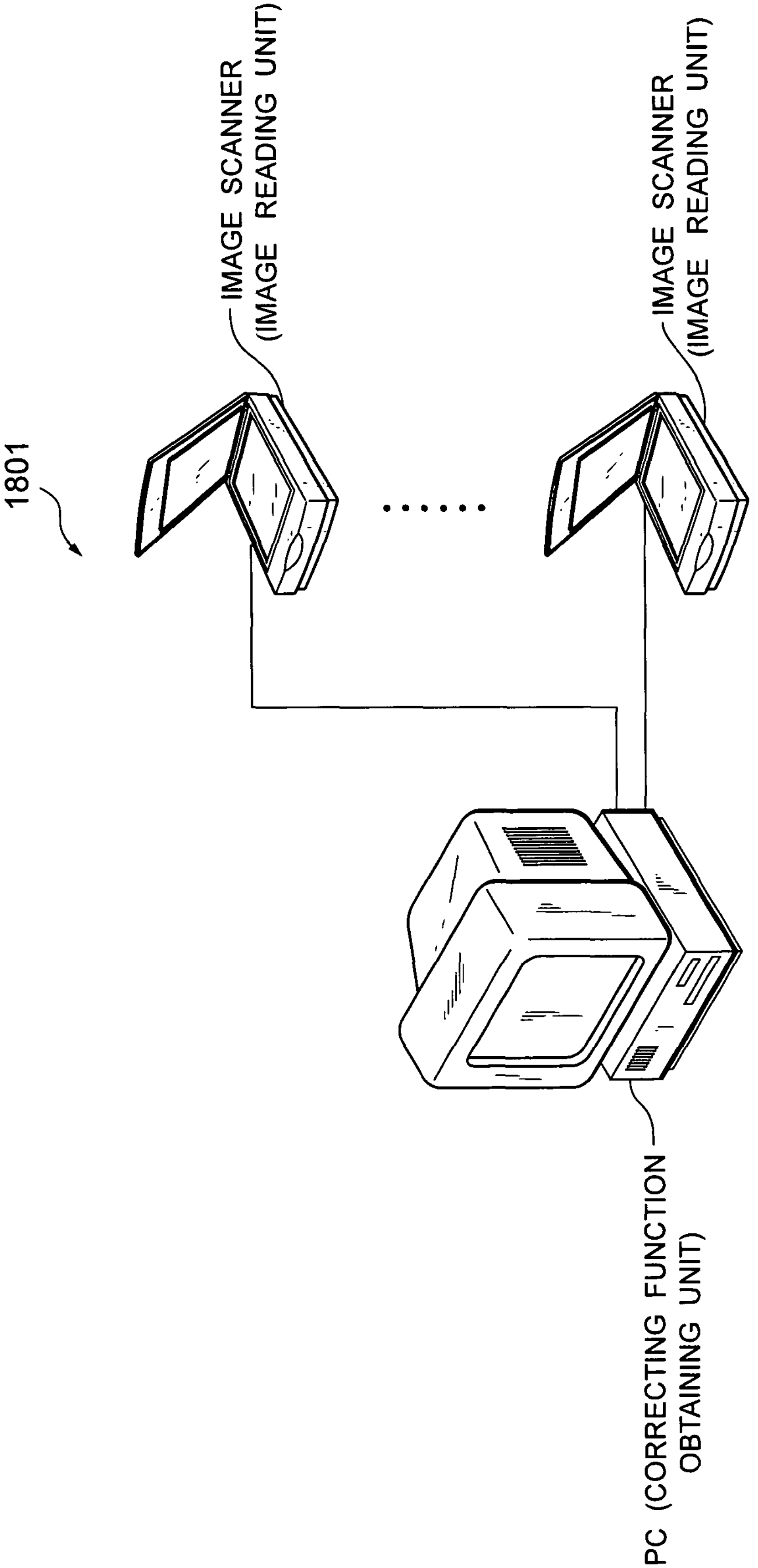
FIG. 14 is a constructional diagram of an image processing apparatus of the embodiment 3.

As shown in FIG. 14, the image processing apparatus 1801 comprises: a personal computer to execute various arithmetic operations; and N image scanners to obtain the image data (where, $N \geqq 2$: in the embodiment, subsequent explanation will be made on the assumption that N=2).

Figure 15:
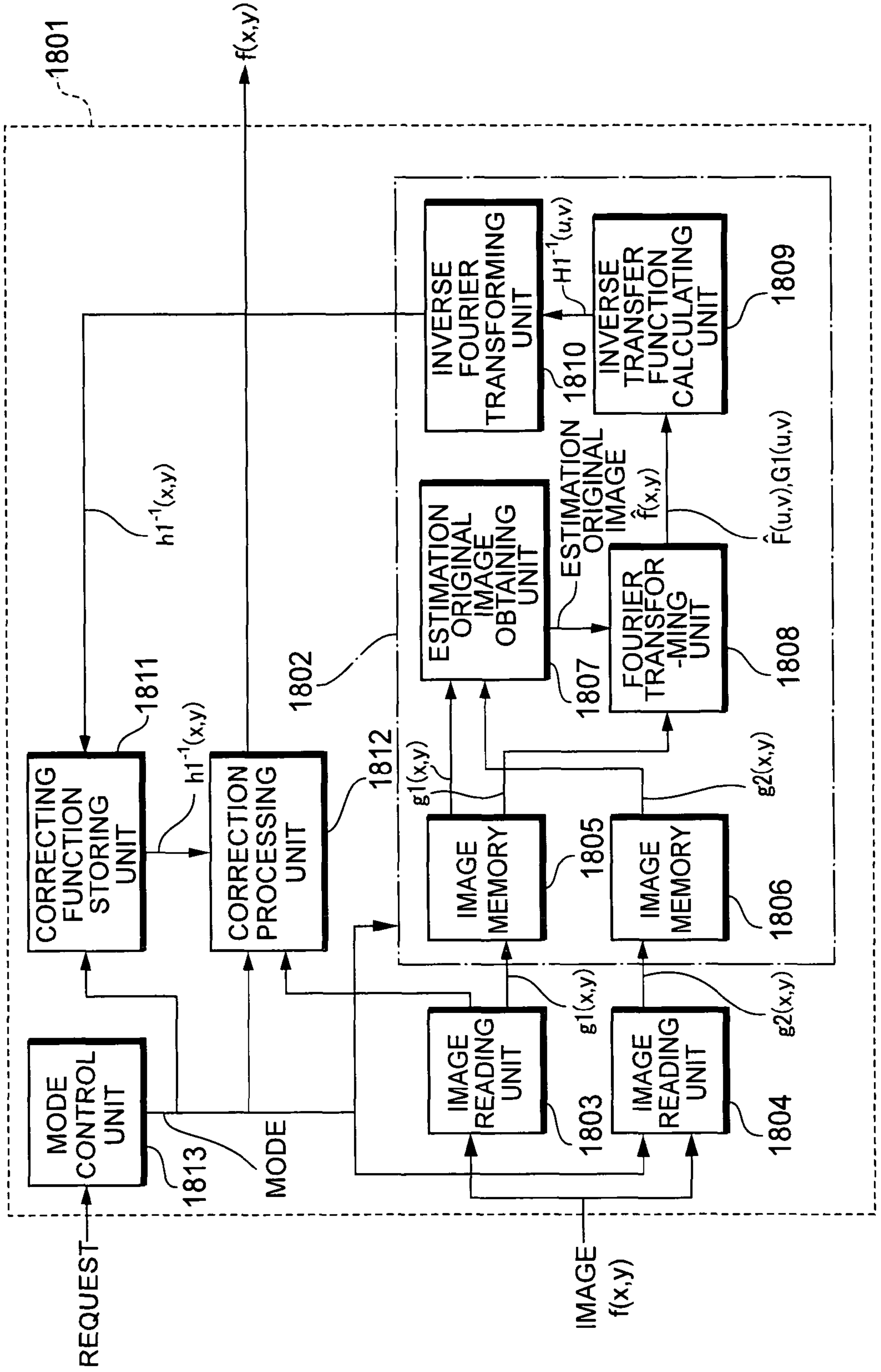
FIG. 15 is a functional block diagram of the image processing apparatus of the embodiment 3.

As shown in a functional block of FIG. 15, the image processing apparatus 1801 having the personal computer and the image scanners comprises: a plurality of image reading units (image scanners) 1803 and 1804 each for executing an image reading process and obtaining image information; a correcting function obtaining unit 1802 for obtaining an inverse filter as a correcting function on the basis of the obtained image information; a correcting function storing unit 1811 for holding the correcting function obtained by the correcting function obtaining unit; a correction processing unit 1812 for executing a correcting process of the image (image information) by using the correcting function held in the correcting function storing unit; and a mode control unit 1813 for switching modes in response to an input instruction from the operator to execute either an updating mode for executing an updating process of the correcting function or a correction processing mode for executing a deterioration correcting process to the image.

Figure 16:
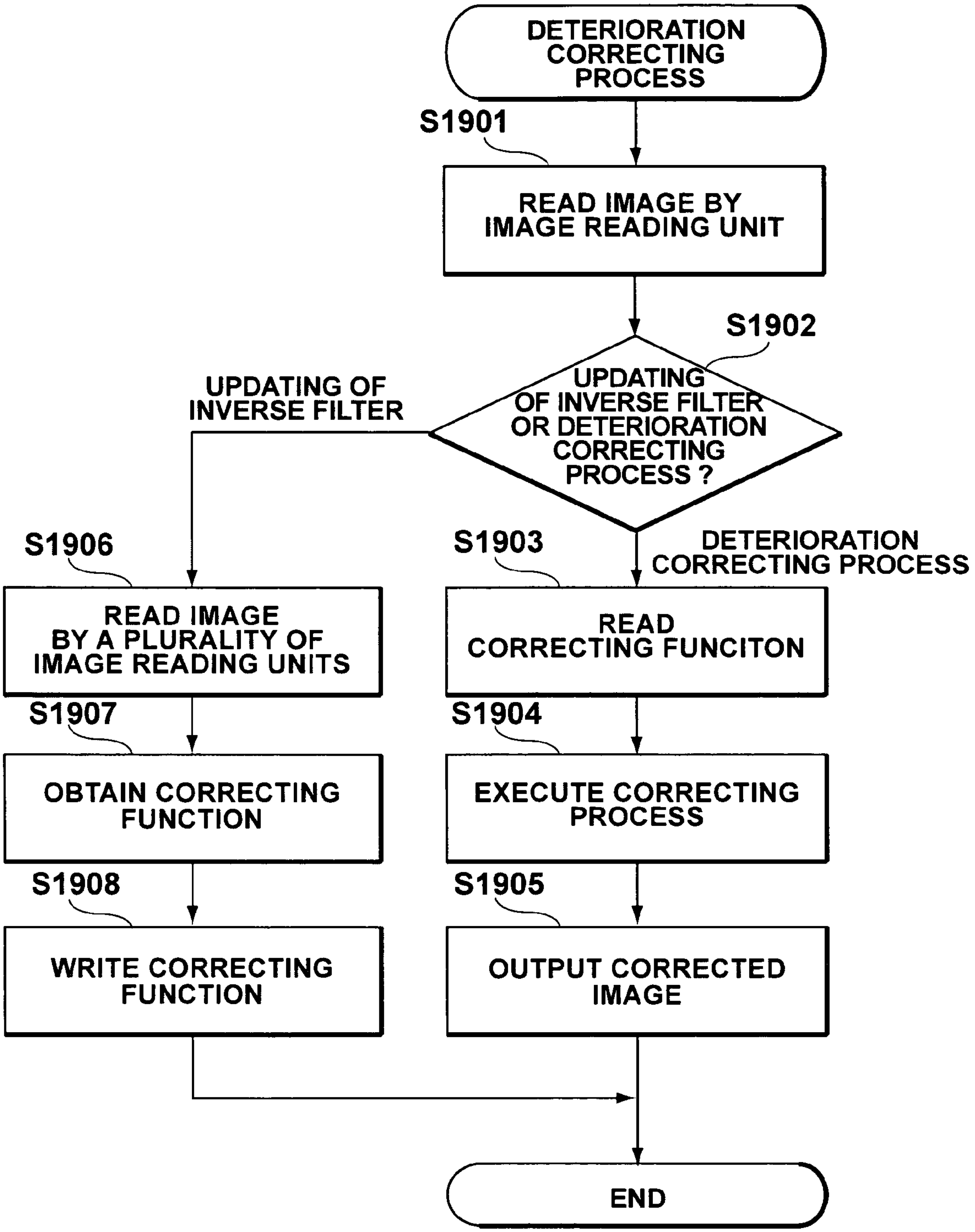
FIG. 16 is a flowchart showing the operation of the image processing apparatus of the embodiment 3.

Prior to explaining the deterioration correcting process in detail, an outline of the operation of the image processing apparatus 1801 will be described with reference to a flowchart of FIG. 16.

The image is read by the image reading unit 1803 (step S1901). After that, whether the correcting function is updated or the deterioration correcting process is executed is discriminated on the basis of mode selection information from the mode control unit 1813 which receives a request from the user (step S1902).

In the deterioration correction processing mode, the correcting function held in the correcting function storing unit 1811 is read out (step S1903). The correction processing unit 1812 executes the deterioration correcting process to the image by using the correcting function (step S1904). The deterioration-corrected image is outputted (step S1905).

If it is determined in step S1902 that the updating mode of the correcting function has been selected, the image is read by the image reading unit 1804 and the image reading operation in a plurality of image reading units 1803 and 1804 is completed (step S1906). The correcting function obtaining unit 1802 obtains the correcting function on the basis of the obtained image (step S1907). The obtained correcting function is held in the correcting function storing unit 1811 (step S1908).

The correcting function obtaining unit 1802 to form the correcting function in the updating mode will now be described in detail.

The correcting function obtaining unit 1802 comprises: an image memory 1805 for temporarily storing image information when one image shown by f(x,y) is read by the image reading unit 1803 and the image information shown by g1(x, y) is formed; an image memory 1806 for temporarily storing image information when the image shown by f(x,y) is read by the image reading unit 1804 and the image information shown by g2(x,y) is formed; an estimation original image obtaining unit 1807 for obtaining an estimation original image shown by fhat(x,y) on the basis of each of the obtained image information; a Fourier transforming unit 1808 for executing a Fourier transformation on the basis of the obtained estimation original image fhat(x,y) and the image information g1(x,y) held in the image memory 1805; an inverse transfer function calculating unit 1809 for obtaining an inverse transfer function as a frequency area correcting function shown by $H1^{-1}(u,v)$ on the basis of a Fourier transformation result Fhat(x,y) obtained by executing the Fourier transformation to the estimation original image fhat(x,y) and a Fourier transformation result G1(u,v) obtained by executing the Fourier transformation to the image information g1(x,y); and an inverse Fourier transforming unit 1810 for executing an inverse Fourier transformation to the obtained inverse transfer function $H1^{-1}(u,v)$ and obtaining a correcting function shown by $h1^{-1}(x,y)$.

Figure 17:
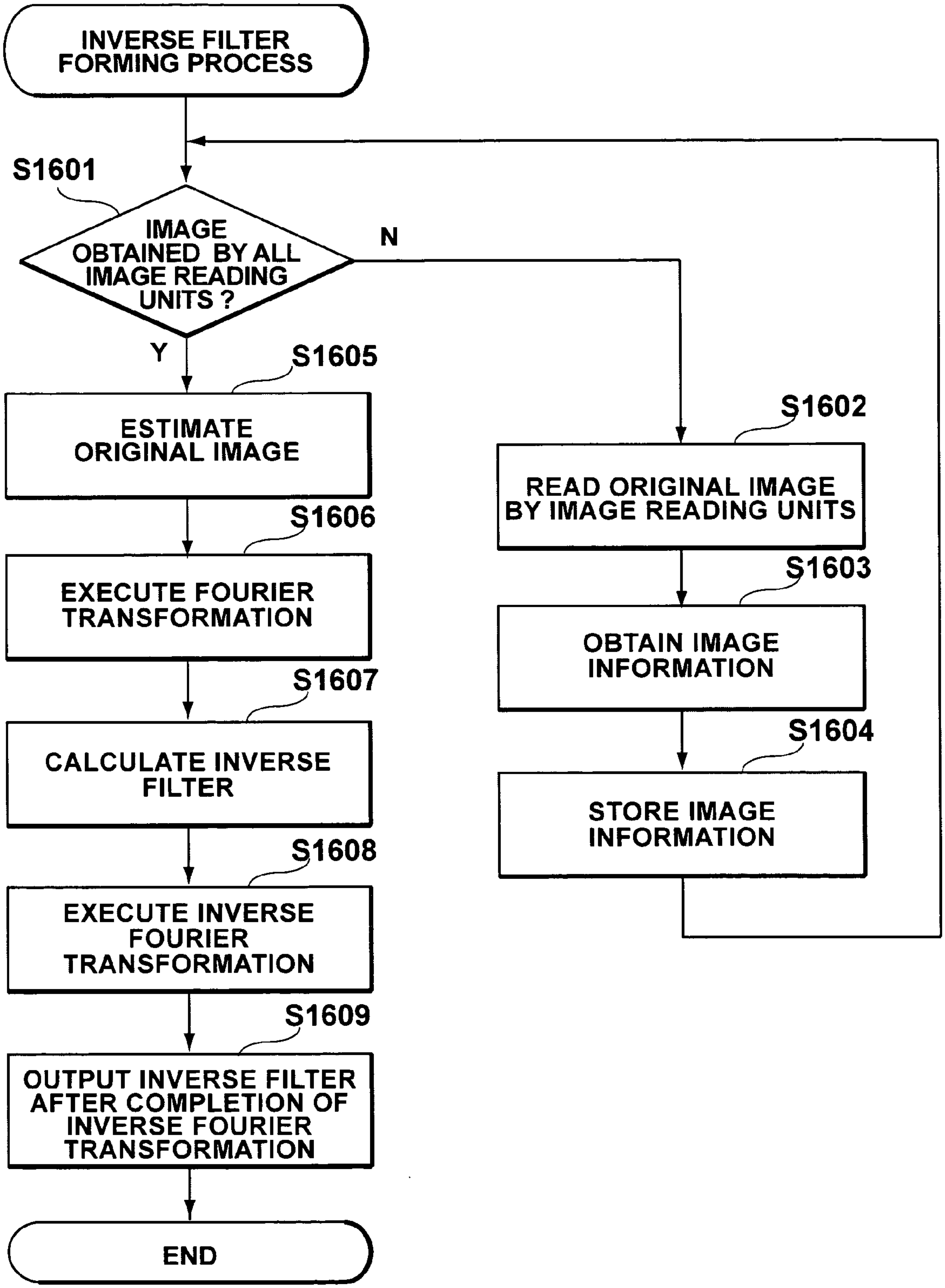
FIG. 17 is a flowchart showing an outline of the deriving operation of a correcting function of the image processing apparatus of the embodiment 3.

An outline of the deriving operation of the correcting function by the image processing apparatus 1801 will now be described with reference to a flowchart of FIG. 17. Whether or not the image reading operation for one image f(x,y) has been finished in all image reading units, that is, the image reading units 1803 and 1804 and the image (image information) has been held in the image memories 1805 and 1806 is discriminated (step S1601). If the image f(x,y) is not read yet by all of the image reading units 1803 and 1804 and the obtainment of the image information g1(x,y) and g2(x,y) is not completed yet, the image f(x,y) is read by the image reading units (step S1602). If the image information is obtained (step S1603), it is held in the image memories (step S1604).

If the image reading operation has been finished in all of the image reading units in step S1601, the estimation original image obtaining unit 1807 reads out the image information g1(x,y) and g2(x,y) from the image memories and obtains the estimation original image fhat(x,y) on the basis of the image information g1(x,y) and g2(x,y) (step S1605).

Subsequently, the Fourier transforming unit 1808 executes the Fourier transformation to the estimation original image fhat(x,y) and the obtained image information g1(x,y) (step S1606), thereby obtaining Fourier transformation results shown by Fhat(u,v) and G1(u,v).

After that, the inverse transfer function calculating unit 1809 obtains the inverse transfer function (frequency area correcting function) shown by $H1^{-1}(u,v)$ on the basis of the Fourier transformation results (step S1607). The inverse Fourier transforming unit 1810 executes the inverse Fourier transforming process to the obtained inverse transfer function, obtains the correcting function shown by $h1^{-1}(u,v)$ (step S1608), and obtains the correcting function corresponding to the image reading unit by using the obtained correcting function (step S1609).

The foregoing operation will now be described in detail.

A deterioration relation between the image shown by f(x,y) and a deteriorating function shown by h(x,y) can be modeled as shown by the following equation (28).

$$g(x, y) = \sum_{s=-M}^{M} \sum_{t=-M}^{M} h(s, t) f(x-s, y-t) \tag{28}$$

where, h(x,y): deteriorating function g(x,y): measurement image

When the term regarding the right side f(x,y) in the equation (28) is Taylor-expanded, a first order differentiation regarding x in f(x,y) is assumed to be $f_x(x,y)$, and a second order differentiation regarding x in f(x,y) is assumed to be $f_{xx}(x,y)$, the equation (28) can be shown by the following equation (29).

$$f(x-s, y-t) = f(x, y) - sf_x(x, y) - tf_x(x, y) + \frac{1}{2}s^2 f_{xx}(x, y) + \cdots \tag{29}$$

Therefore, the equation (28) can be expressed by the following equation (30) by using the equation (29).

$$g(x,y)=a_0 f(x,y)+a_1 f_x(x,y)+a_2 f_y(x,y)+a_3 f_{xx}(x,y)+ \ldots \tag{30}$$

It is assumed that the image f(x,y) was read by the two image reading units 1803 and 1804 and the two different measurement image information g1 and g2 (deteriorated by the two different deteriorating functions) were obtained.

It can be considered that $a_1 f_x(x,y)+a_2 f_y(x,y)+ \ldots$ after $a_0 f(x,y)$ is a portion in which the color noises included in the measurement image information have been modeled. When the color noises are approximated by $a_1 f_x(x,y)$ of the first degree (the second order differentiation and subsequent differentiation are omitted) and expressed by vectors $f=[f,f']^T$ and $g=[g1,g2]^T$, respectively, it can be considered that the vector g(x,y) of the measurement image information is a linear mixture of the differentiation image vector f(x,y) on the basis of the equation (29). When its mixture amount is assumed to be a matrix A (matrix of n=2), the vector g(x,y) can be expressed by a linear equation of a scalar arithmetic operation as shown by the following equation (31).

$$g(x,y)=A \cdot f(x,y) \tag{31}$$

At this time, assuming that the matrix A in the equation (31) is a matrix of n=2, its relation is similar to that of the equation (5). That is, when the matrix A is considered as a mixture line amount of the image deterioration in place of a mixture line amount of the concentration deterioration in the foregoing embodiment, in the signal in which f(x,y) and $f^{(1)}(x,y)$ have been mixed, by separating f(x,y) and $f^{(1)}(x,y)$, the original image f(x,y) and the deterioration image (color noises) are separated.

The estimation of the original image f by the independent component analysis in the estimation original image obtaining unit 1807 will be described here. Although various algorithms are considered for the estimation of the original image in the embodiment, the original image f(x,y) is estimated here by, for example, the JADE method in a manner similar to the embodiment 1 without particularly limiting the algorithm.

Figure 18:
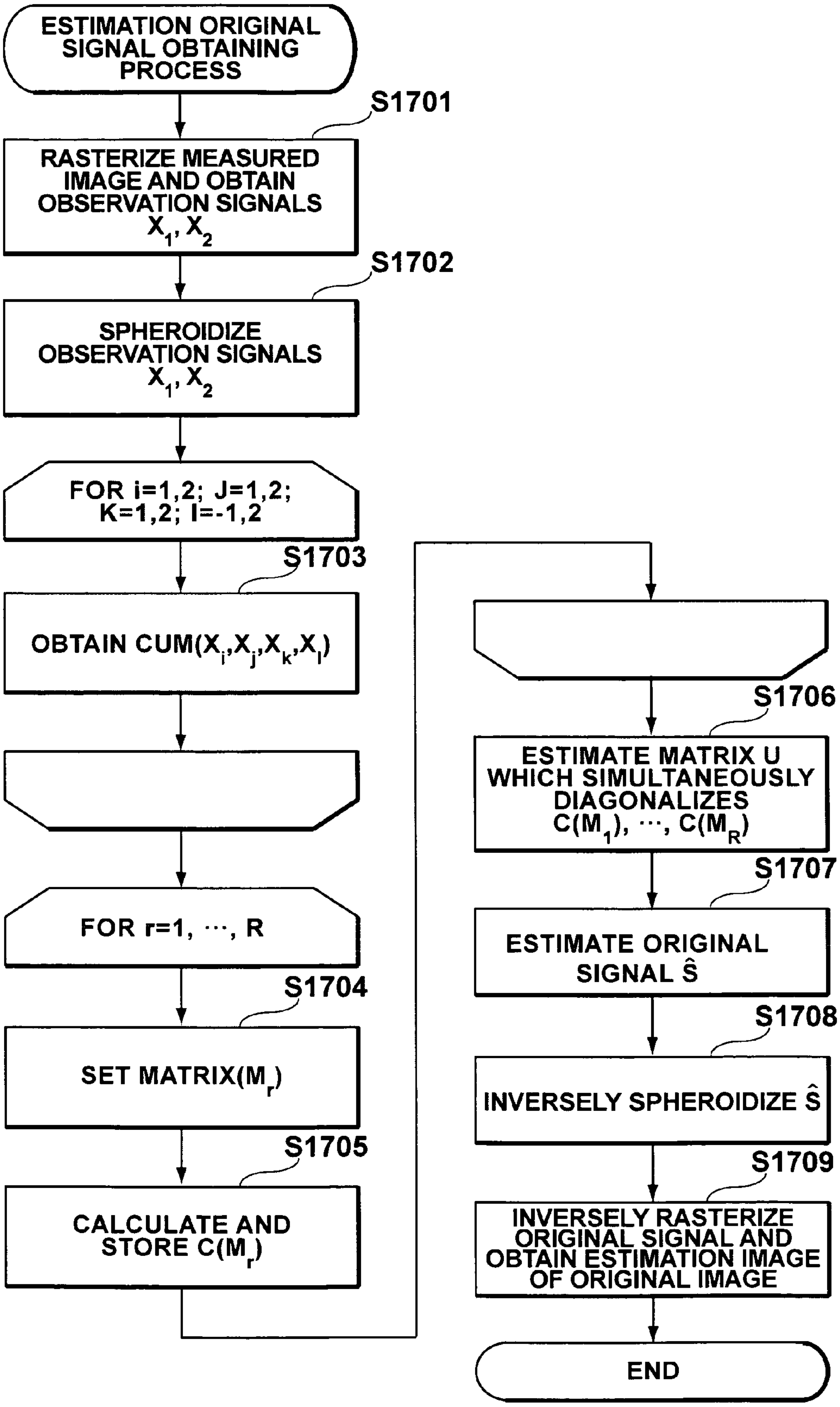
FIG. 18 is a flowchart showing the obtaining operation of an estimation original image of an estimation original image obtaining unit in the embodiment 3.

As shown in FIG. 18, the obtaining operation of the estimation original image by the estimation original image obtaining unit 1807 in the embodiment corresponds to the operation obtained by adding a process regarding the rasterization to the operation described with reference to the flowchart of FIG. 7 in the foregoing embodiment.

Figure 7:
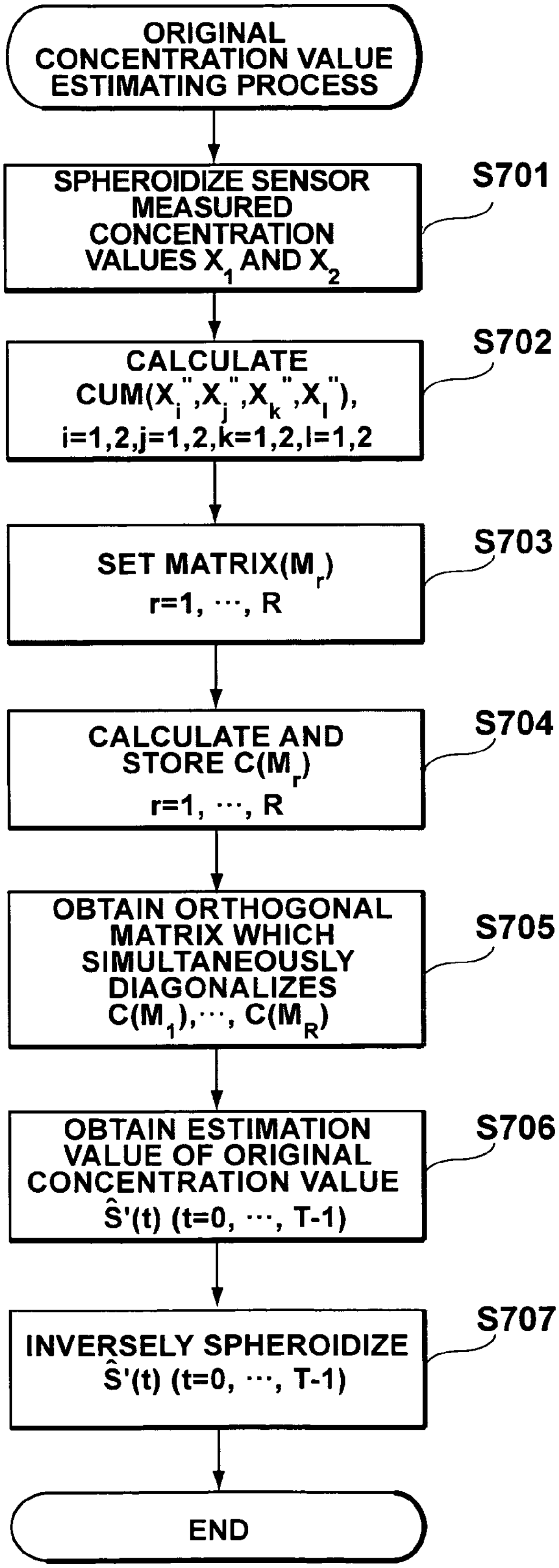
FIG. 7 is a flowchart showing the operation of an independent component analysis.

That is, in the embodiment 3, since the process for the image is executed, a process for obtaining one-dimensional image information (observation signal) by executing the rasterizing process to the image information obtained by the measurement (step S1701) and a process for obtaining the estimation value of the original image by executing the inverse rasterization transforming process to the estimation value of the original signal (original image) (step S1709) are added to the operation shown in FIG. 7 mentioned above.

When the estimation value of the original image is obtained by the estimation original image obtaining unit 1807 for executing the rasterizing process for the image, the Fourier transforming unit 1808 executes the Fourier transforming process to the estimation value of the original image and the image information from the image memory 1805, thereby obtaining a Fourier transformation result F(u,v) of the estimation value fhat(x,y) of the original image and a Fourier transformation result G(u,v) of the image information.

When the equation (28) is Fourier-transformed, it can be expressed as shown by the following equation (32).

$$G(u,v)=H(u,v)\cdot F(u,v) \tag{32}$$

where,

G(u,v): result obtained by Fourier-transforming g(x,y)

H(u,v): result obtained by Fourier-transforming h(x,y)

F(u,v): result obtained by Fourier-transforming f(x,y)

An inverse transfer function of the deteriorating function (transfer function) can be shown by the following equation (33) on the basis of F(u,v) and G(u,v) in the equation (32).

$$f'(x,y)=h_1^{-1}(x,y)*g_1(x,y) \tag{33}$$

where, *: convolution integration

This inverse transfer function is obtained by the inverse transfer function calculating unit 1809.

The inverse Fourier transforming unit 1810 executes the inverse Fourier transforming process to the obtained inverse transfer function, thereby obtaining a correcting function $h^{-1}$ ($Fourier^{-1}[H^{-1}(u,v)]$) for deterioration correction.

The obtained correcting function $h^{-1}$ is held in the correcting function storing unit 1811. When the correcting mode is instructed by the mode control unit 1813, the correction processing unit 1812 reads out the correcting function from the correcting function storing unit 1811 and executing the deterioration correcting process to the original image by using the correcting function.

As mentioned above, according to the image processing apparatus 1801 of the invention, the image is read by the different image reading units and, when each image information is obtained, the independent component analysis is made on the basis of the image information, so that the estimation value of the original image in which the influence of the color noises is reduced can be obtained. The obtained estimation original image information and the image information are transformed into the frequency areas, thereby obtaining the frequency area estimation original image information and the frequency area image information. On the basis of those information, the frequency area correcting function is formed. By executing the inverse frequency correction transforming process to the frequency area correcting function, the correcting function is obtained. Thus, the color noises included in the image information can be separated by using the correcting function and the color noises included in the image information can be reduced.

Although the image forming apparatus for executing the concentration correcting process has been described as an example in the embodiments 1 and 2 and the image processing apparatus for executing the image correcting process has been described as an example in the embodiment 3, the concentration correcting process described in the embodiments 1 and 2 may be applied to the image processing apparatus and the image correcting process described in the embodiment 3 may be also applied to the image forming apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing method, comprising the steps of:

(a) using a plurality of optical sensors in a concentration measuring unit to measure concentration in a concentration pattern, and obtaining measured concentration values;

(b) estimating original concentration by an independent component analysis on the basis of the obtained measured concentration values and obtaining at least one estimation value;

(c) obtaining at least one correction value on the basis of the at least one estimation value and at least one predetermined reference concentration value;

(d) correcting image information using the at least one correction value to provide corrected image information; and (e) printing the corrected image information onto a print medium.

2. The image processing method according to claim 1, wherein the step (c) comprises the steps of:

transforming the at least one estimation value and the measured concentration values into frequency areas and obtaining at least one frequency area estimation value and at least one frequency area measured concentration value;

forming at least one frequency area correcting function on the basis of the at least one frequency area estimation value and the at least one frequency area measured concentration value; and executing at least one inverse frequency area transformation with respect to the at least one frequency area correcting function.

3. The image processing method according to claim 1, wherein the original concentration is original image information, and wherein step (c) comprises the steps of:

transforming at least one estimated original image information value and the image information into frequency areas and obtaining estimated frequency area original image information and frequency area image information;

forming at least one frequency area correcting function with respect to the at least one correction value on the basis of the estimated frequency area original image information and the frequency area image information; and executing at least one inverse frequency area transformation with respect to the frequency area correcting function.

4. The image processing method according to claim 1, wherein plural concentration values are measured by the optical sensors.

5. The image processing method according to claim 1, wherein at least one of the optical sensors comprises a concentration sensor.

6. An image processing apparatus, comprising:
a measured concentration value obtaining unit which measures the concentration in a concentration pattern by a plurality of optical sensors and obtains measured concentration values;
an estimation value obtaining unit which estimates original concentration by an independent component analysis on the basis of the measured concentration values and obtains estimation values;
a correction value obtaining unit which obtains correction values for allowing the measured concentration values to approach the estimation values;
an image correcting unit for correcting image information using the correction values to provide corrected image information; and
a print engine unit for printing the corrected image information onto a print medium.

7. The image processing apparatus according to claim 6, wherein the correction value obtaining unit comprises:
a frequency area transforming unit which transforms the estimation values and the measured concentration values into frequency areas and obtains at least one frequency area estimation value and at least one frequency area measured concentration value;
a frequency area correcting function forming unit which forms at least one frequency area correcting function on the basis of the at least one frequency area estimation value and the at least one frequency area measured concentration value; and
a correcting function forming unit which executes at least one inverse frequency area transformation with respect to the at least one frequency area correcting function.

8. The image processing apparatus according to claim 6, wherein the optical sensors are provided in an image information obtaining unit and the original concentration is original image information, and
wherein the correction value obtaining unit comprises:
a frequency area transforming unit which transforms estimated original image information and the image information into frequency areas and obtains frequency area estimation original image information and frequency area image information;
a frequency area correcting function forming unit which forms at least one frequency area correcting function on the basis of the frequency area estimation original image information and the frequency area image information; and
a correcting function forming unit which executes at least one inverse frequency area transformation with respect to the at least one frequency area correcting function.

9. An image forming apparatus, comprising:
a measured concentration value obtaining unit which measures the concentration in a concentration pattern by a plurality of optical sensors and obtains measured concentration values;
an estimation value obtaining unit which estimates original concentration by an independent component analysis on the basis of the measured concentration values and obtains estimation values;
a correction value obtaining unit which obtains correction values for allowing the measured concentration values to approach the estimation values;
an image control unit for correcting image information using the correction values to provide corrected image information;
a print engine unit for printing the corrected image information onto a print medium; and
a control unit for controlling the measured concentration value obtaining unit, the estimation value obtaining unit, the correction value obtaining unit, the image control unit, and the print engine unit.

10. The image forming apparatus according to claim 9, wherein the correction value obtaining unit comprises:
a frequency area transforming unit which transforms the estimation values and the measured concentration values into frequency areas and obtains at least one frequency area estimation value and at least one frequency area measured concentration value;
a frequency area correcting function forming unit which forms at least one frequency area correcting function on the basis of the at least one frequency area estimation value and the at least one frequency area measured concentration value; and
a correcting function forming unit which executes at least one inverse frequency area transformation with respect to the at least one frequency area correcting function.

11. The image forming apparatus according to claim 9, wherein the optical sensors are provided in an image information obtaining unit and the original concentration is original image information, and
wherein the correction value obtaining unit comprises:
a frequency area transforming unit which transforms estimated original image information and the image information into frequency areas and obtains frequency area estimation original image information and frequency area image information;
a frequency area correcting function forming unit which forms at least one frequency area correcting function on the basis of the frequency area estimation original image information and the frequency area image information; and
a correcting function forming unit which executes at least one inverse frequency area transformation with respect to the at least one frequency area correcting function.

* * * * *